US012604333B2

(12) United States Patent
Paladugu et al.

(10) Patent No.: US 12,604,333 B2
(45) Date of Patent: Apr. 14, 2026

(54) RELAY OPERATIONS IN WIRELESS COMMUNICATION

(71) Applicant: QUALCOMM Incorporated, San Diego, CA (US)

(72) Inventors: Karthika Paladugu, Hyderabad (IN); Hong Cheng, Basking Ridge, NJ (US); Peng Cheng, Beijing (CN); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 445 days.

(21) Appl. No.: 18/264,392

(22) PCT Filed: Feb. 23, 2022

(86) PCT No.: PCT/CN2022/077431
§ 371 (c)(1),
(2) Date: Aug. 4, 2023

(87) PCT Pub. No.: WO2022/227825
PCT Pub. Date: Nov. 3, 2022

(65) Prior Publication Data
US 2024/0107572 A1      Mar. 28, 2024

(30) Foreign Application Priority Data

Apr. 30, 2021    (WO) ............... PCT/CN2021/091563

(51) Int. Cl.
*H04W 72/543*      (2023.01)
*H04W 72/04*       (2023.01)
*H04W 72/56*       (2023.01)

(52) U.S. Cl.
CPC ......... *H04W 72/543* (2023.01); *H04W 72/04* (2013.01); *H04W 72/56* (2023.01)

(58) Field of Classification Search
None
See application file for complete search history.

(56) References Cited

U.S. PATENT DOCUMENTS 10,893,557 B2    1/2021  Gulati et al.
10,912,114 B2    2/2021  Baghel et al.
(Continued)

FOREIGN PATENT DOCUMENTS

CN      104244444 A    12/2014
WO      2018204130 A1  11/2018
WO      2018204321     11/2018

OTHER PUBLICATIONS

Ericsson: "Up Aspects for Layer 2 SL Relay", 3GPP TSG-RAN WG2 #113bis-e, R1-2103002, Electronic meeting, Apr. 12, 2021-Apr. 20, 2021, pp. 1-3, Apr. 20, 2021 (Apr. 20, 2021), part 2.
(Continued)

*Primary Examiner* — Kouroush Mohebbi
(74) *Attorney, Agent, or Firm* — Loza & Loza LLP

(57)      ABSTRACT

A relay user equipment (UE) can relay communication between remote UEs and a network entity via one or more remote device end-to-end (E2E) radio bearers (RB s) established between the network entity and the remote UEs. The remote device E2E radio bearers can be multiplexed into one or more logical channel between the relay UE and the network entity. The relay UE and/or the network entity can allocate communication resources to the remote UEs in consideration of the E2E bearer quality of service (QoS) requirement using, for example, logical channel prioritization at the relay UE and/or different buffer status reports that can provide information on the remote UEs and E2E bearers to facilitate the allocation of resources.

30 Claims, 20 Drawing Sheets

(56)     References Cited

U.S. PATENT DOCUMENTS

| | | | |
|---|---|---|---|
| 2017/0006649 A1 | 1/2017 | Zhao et al. | |
| 2017/0118693 A1 | 4/2017 | Tsuboi et al. | |
| 2018/0054755 A1* | 2/2018 | Lee ..................... | H04W 72/21 |
| 2018/0069618 A1 | 3/2018 | Loehr et al. | |
| 2018/0213577 A1 | 7/2018 | Burbidge et al. | |
| 2018/0279202 A1 | 9/2018 | Tenny et al. | |
| 2019/0053215 A1 | 2/2019 | Yu et al. | |
| 2019/0182639 A1* | 6/2019 | Basu Mallick ....... | H04W 72/23 |

OTHER PUBLICATIONS

Huawei, et al., "Adaptation Layer Functionalities for L2 U2N Relay", 3GPP TSG-RAN WG2 Meeting #113bis Electronic, R1-2103494, Online, Apr. 12, 2021-Apr. 20, 2021, pp. 1-5, Apr. 20, 2021 (Apr. 20, 2021) the whole document.
International Search Report and Written Opinion—PCT/CN2021/091563—ISA/EPO—Jan. 25, 2022.
International Search Report and Written Opinion—PCT/CN2022/077431—ISA/EPO—May 12, 2022.
Supplementary European Search Report—EP22794305—Search Authority—The Hague—Feb. 13, 2025.

\* cited by examiner

700

702

Allocate resources to remote UE E2E bearers with $Bj > 0$ based on their relative priority

704

Resources remaining?

No

Yes

706

Allocate resources to remote UE E2E bearers in a decreasing priority order regardless of $Bj$ value until either the data for the Uu logical channel or UL grant exhausted End Short Relay-BSR Format 1

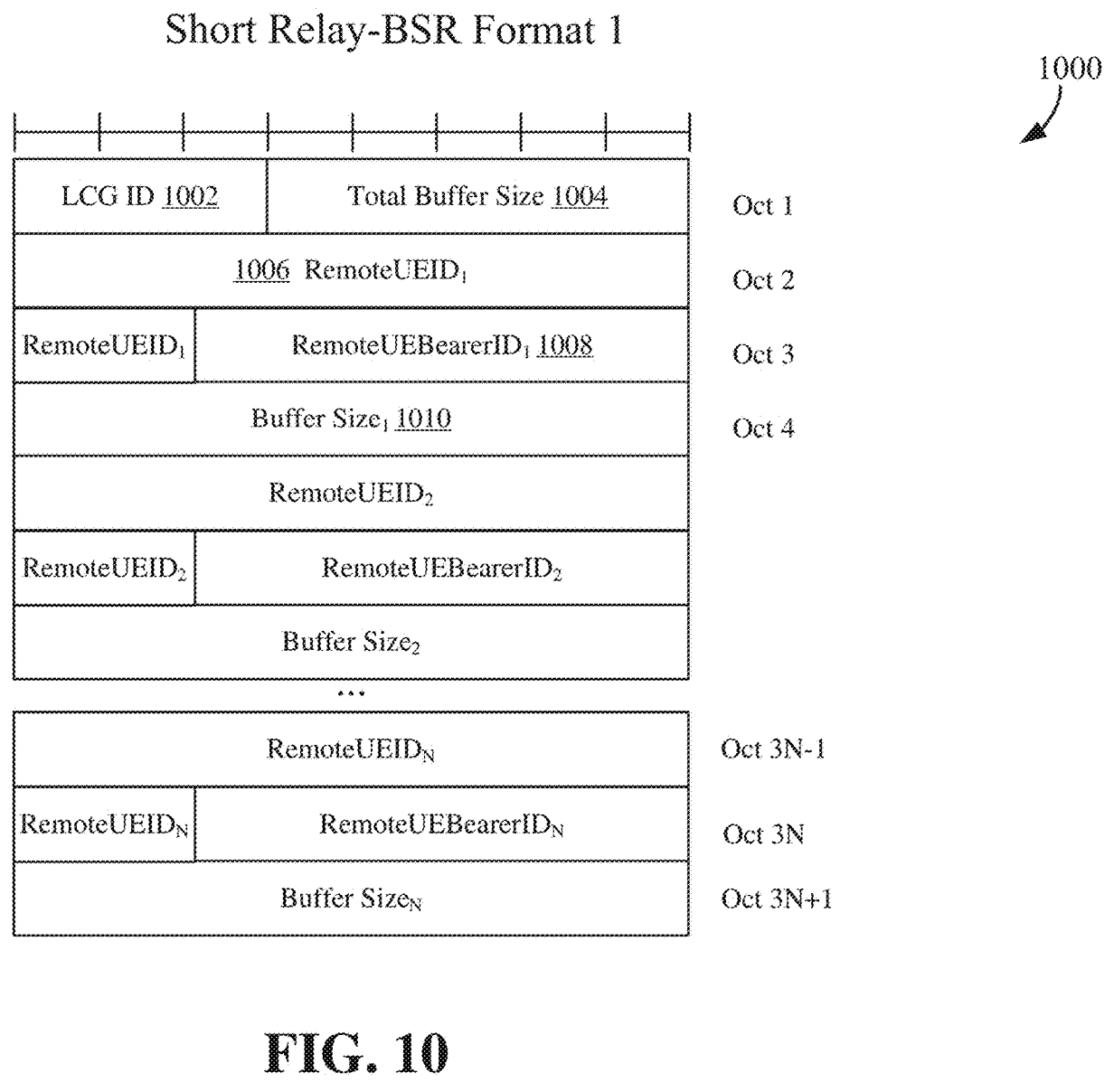

| | Oct 1 |
|---|---|
| LCG ID 1002 | Total Buffer Size 1004 |
| 1006 RemoteUEID₁ | Oct 2 |
| RemoteUEID₁ | RemoteUEBearerID₁ 1008 |
| | Buffer Size₁ 1010 |

FIG. 10

Short Relay-BSR Format 2a

FIG. 11

Short Relay-BSR Format 2b

Figure 14:
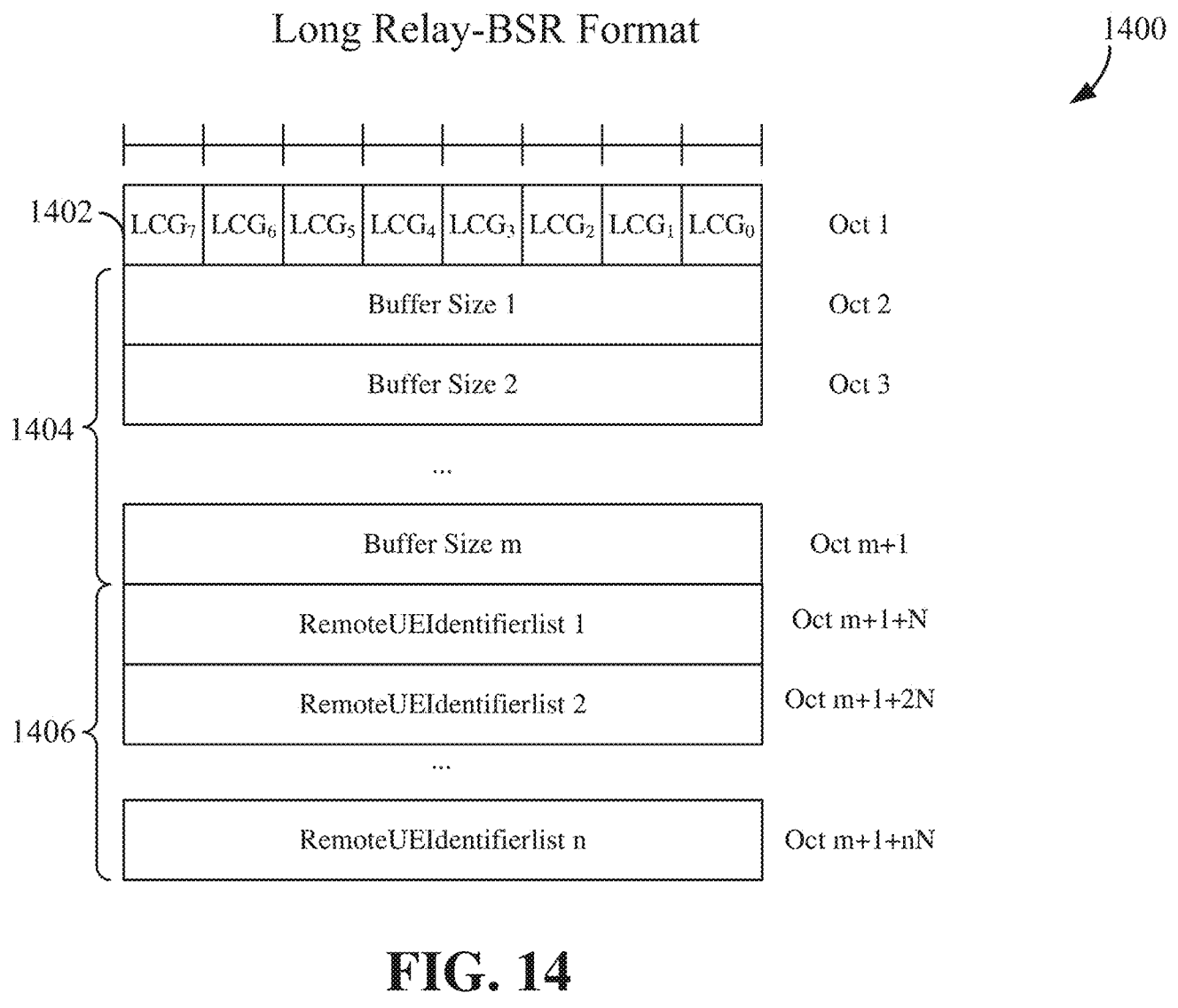

1400

Long Relay-BSR Format

| | | | | | | | |
|---|---|---|---|---|---|---|---|
| LCG$_7$ | LCG$_6$ | LCG$_5$ | LCG$_4$ | LCG$_3$ | LCG$_2$ | LCG$_1$ | LCG$_0$ |

Oct 1

Buffer Size 1 — Oct 2

Buffer Size 2 — Oct 3

...

Buffer Size m — Oct m+1

RemoteUEIdentifierlist 1 — Oct m+1+N

RemoteUEIdentifierlist 2 — Oct m+1+2N

...

RemoteUEIdentifierlist n — Oct m+1+nN

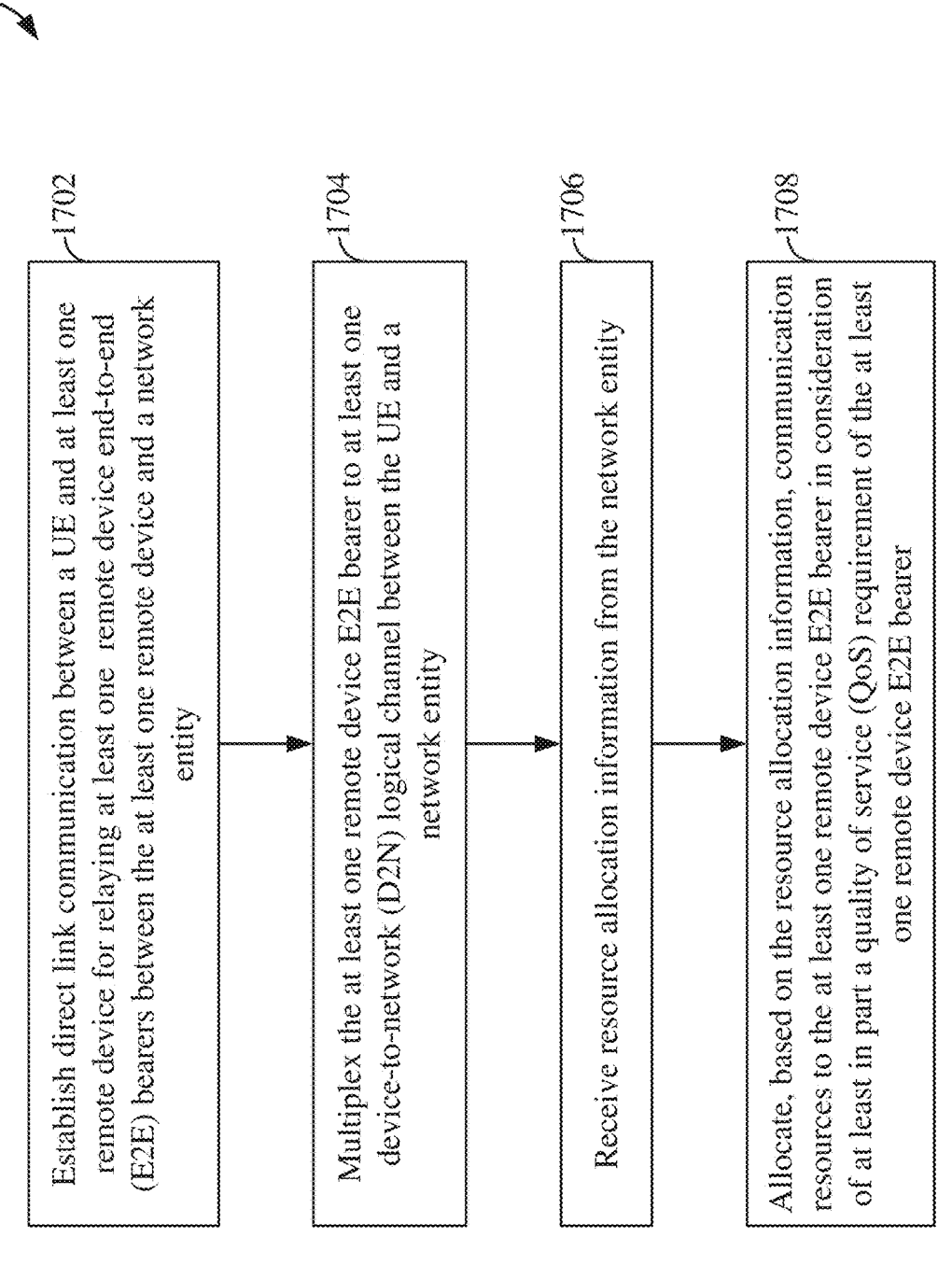

1700

1702

Establish direct link communication between a UE and at least one remote device for relaying at least one remote device end-to-end (E2E) bearers between the at least one remote device and a network entity

1704

Multiplex the at least one remote device E2E bearer to at least one device-to-network (D2N) logical channel between the UE and a network entity

1706

Receive resource allocation information from the network entity

1708

Allocate, based on the resource allocation information, communication resources to the at least one remote device E2E bearer in consideration of at least in part a quality of service (QoS) requirement of the at least one remote device E2E bearer

FIG. 17

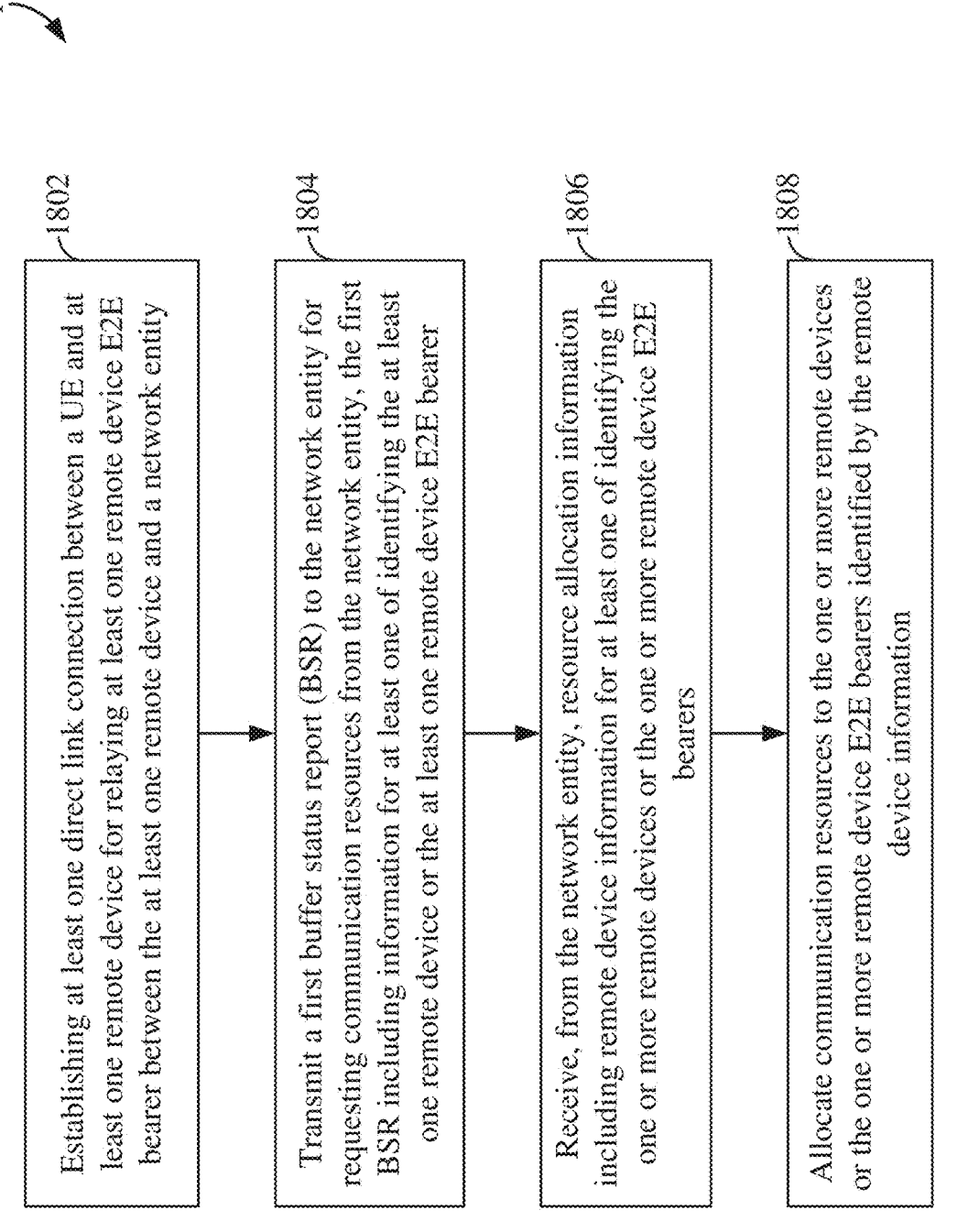

1800

1802

Establishing at least one direct link connection between a UE and at least one remote device for relaying at least one remote device E2E bearer between the at least one remote device and a network entity

1804

Transmit a first buffer status report (BSR) to the network entity for requesting communication resources from the network entity, the first BSR including information for at least one of identifying the at least one remote device or the at least one remote device E2E bearer

1806

Receive, from the network entity, resource allocation information including remote device information for at least one of identifying the one or more remote devices or the one or more remote device E2E bearers

1808

Allocate communication resources to the one or more remote devices or the one or more remote device E2E bearers identified by the remote device information

FIG. 18

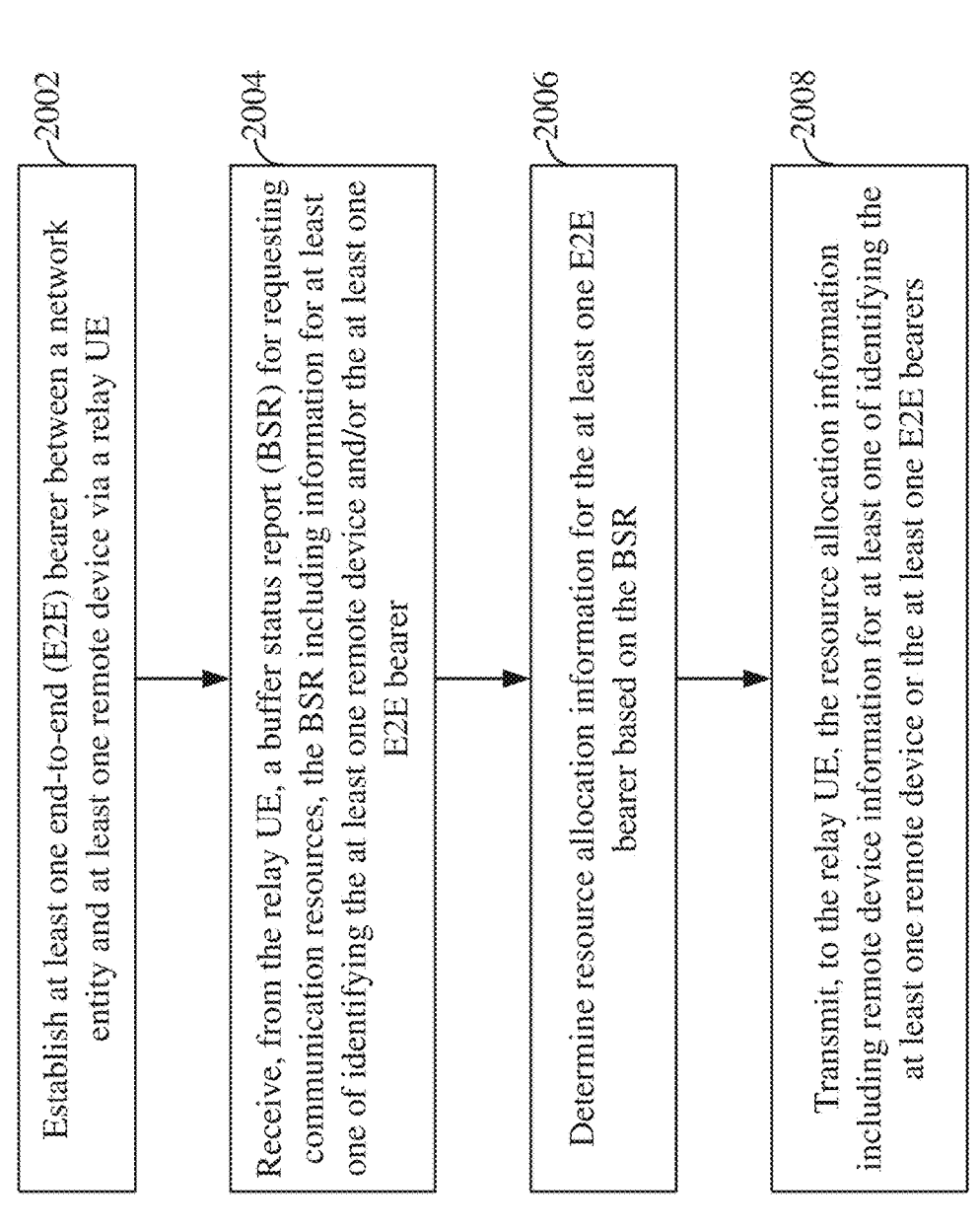

2000

2002

Establish at least one end-to-end (E2E) bearer between a network entity and at least one remote device via a relay UE

2004

Receive, from the relay UE, a buffer status report (BSR) for requesting communication resources, the BSR including information for at least one of identifying the at least one remote device and/or the at least one E2E bearer

2006

Determine resource allocation information for the at least one E2E bearer based on the BSR

2008

Transmit, to the relay UE, the resource allocation information including remote device information for at least one of identifying the at least one remote device or the at least one E2E bearers

FIG. 20

RELAY OPERATIONS IN WIRELESS COMMUNICATION

PRIORITY CLAIM

This application is the U.S. national stage of PCT patent application number PCT/CN2022/077431 filed on Feb. 23, 2022, which claims priority to and the benefit of PCT International Application No. PCT/CN2021/091563 filed in the China Intellectual Property Office on Apr. 30, 2021.

TECHNICAL FIELD

The technology discussed below relates generally to wireless communication systems, and more particularly, to relaying communication between a remote device and a network node using a user equipment as a relay.

INTRODUCTION

Communication networks have used relays in varying capacities. Relaying in cellular networks seeks to extend network coverage, improve transmission reliability, and recover failed links due to, for example, blockage or fading. A relaying node may be a fixed node or a mobile device (e.g., a user equipment (UE)). A relaying node (e.g., a relay UE) can communicate with a remote UE using device-to-device (D2D) technology. D2D allows UEs to communicate over direct links instead of through cellular network infrastructure. For example, a D2D relay link may be established between a relay UE and a remote UE to enable relaying of information between a base station and the remote UE via the relay UE. A relay UE may use one or more logical channels with the base station to relay multiple direct links between the relay UE and multiple remote UEs.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

One aspect of the disclosure provides a user equipment (UE) for wireless communication. The UE includes a transceiver configured for wireless communication, a memory, and a processor coupled to the transceiver and the memory. The processor and the memory are configured to establish direct link communication between the UE and at least one remote device that relays at least one remote device end-to-end (E2E) bearer between the at least one remote device and a network entity. The processor and the memory are further configured to multiplex the at least one remote device E2E bearer onto at least one device-to-network (D2N) logical channel between the UE and the network entity. The processor and the memory are further configured to receive resource allocation information associated with the at least one D2N logical channel from the network entity. The processor and the memory are further configured to allocate at least a portion of communication resources indicated by the resource allocation information to the at least one remote device E2E bearer according to at least in part a quality of service (QoS) requirement of the at least one remote device E2E bearer.

One aspect of the disclosure provides a method of wireless communication at a user equipment (UE). The UE establishes direct link communication between the UE and at least one remote device that relays at least one remote device end-to-end (E2E) bearer between the at least one remote device and a network entity. The UE multiplexes the at least one remote device E2E bearer onto at least one device-to-network (D2N) logical channel between the UE and the network entity. The UE receives resource allocation information associated with the at least one D2N logical channel from the network entity. The UE allocates at least a portion of communication resources indicated by the resource allocation information to the at least one remote device E2E bearer according to at least in part a quality of service (QoS) requirement of the at least one remote device E2E bearer.

One aspect of the disclosure provides a network entity for wireless communication. The network entity includes a transceiver configured for wireless communication, a memory, and a processor coupled to the transceiver and the memory. The processor and the memory are configured to establish at least one end-to-end (E2E) bearer between the network entity and at least one remote device via a relay UE. The processor and the memory are further configured to receive, from the relay UE using the transceiver, a buffer status report (BSR) requesting communication resources, the BSR comprising information for at least one of identifying the at least one remote device or the at least one E2E bearer. The processor and the memory are further configured to transmit, to the relay UE using the transceiver, resource allocation information associated with the at least one E2E bearer based on the BSR.

One aspect of the disclosure provides a method of wireless communication at a network entity. The network entity establishes at least one end-to-end (E2E) bearer between the network entity and at least one remote device via a relay UE. The network entity receives, from the relay UE, a buffer status report (BSR) requesting communication resources, the BSR comprising information for at least one of identifying the at least one remote device or the at least one E2E bearer. The network entity transmits, to the relay UE, resource allocation information associated with the at least one E2E bearer based on the BSR.

One aspect of the disclosure provides a method of wireless communication at a user equipment (UE). The method includes establishing direct link communication between the UE and one or more remote devices for relaying one or more remote device end-to-end (E2E) bearers between the one or more remote devices and a network entity. The method further includes multiplexing the one or more remote device E2E bearers to one or more device-to-network (D2N) logical channels between the UE and the network entity. The method further includes receiving resource allocation information from the network entity. The method further includes allocating, based on the resource allocation information, communication resources to the one or more remote devices E2E bearers in consideration of at least in part a quality of service (QoS) requirement of the one or more remote device E2E bearers.

Another aspect of the disclosure provides a method of wireless communication at a relay user equipment (UE). The method includes establishing one or more direct link connections between the relay UE and one or more remote devices for relaying one or more remote device end-to-end (E2E) bearers between the one or more remote devices and a network entity. The method further includes transmitting a first buffer status report (BSR) to the network entity for requesting communication resources from the network entity. The first BSR includes information for at least one of identifying the one or more remote devices or the one or more remote device E2E bearers.

Another aspect of the disclosure provides a method of wireless communication at a network entity. The method includes establishing one or more end-to-end (E2E) bearers between the network entity and one or more remote devices via a relay UE. The method further includes receiving, from the relay UE, a buffer status report (BSR) for requesting communication resources. The BSR includes information for at least one of identifying the one or more remote devices or the one or more E2E bearers. The method further includes determining a resources allocation for the one or more E2E bearers based on the BSR.

Another aspect of the disclosure provides a user equipment (UE) for wireless communication. The UE includes a transceiver configured for wireless communication, a memory, and a processor coupled with the transceiver and the memory. The processor and the memory are configured to establish direct link communication between the UE and one or more remote devices for relaying one or more remote device end-to-end (E2E) bearers between the one or more remote devices and a network entity. The processor and the memory are further configured to multiplex the one or more remote device E2E bearers to one or more device-to-network (D2N) logical channels between the UE and the network entity. The processor and the memory are further configured to receive resource allocation information from the network entity. The processor and the memory are further configured to allocate, based on the resource allocation information, communication resources to the one or more remote devices E2E bearers in consideration of at least in part a quality of service (QoS) requirement of the one or more remote device E2E bearers.

Another aspect of the disclosure provides a relay user equipment (UE). The relay UE includes a transceiver configured for wireless communication, a memory, and a processor coupled with the transceiver and the memory. The processor and the memory are configured to establish one or more direct link connections between the relay UE and one or more remote devices for relaying one or more remote device end-to-end (E2E) bearers between the one or more remote devices and a network entity. The processor and the memory are configured to transmit a first buffer status report (BSR) to the network entity for requesting communication resources from the network entity. The first BSR includes information for at least one of identifying the one or more remote devices or the one or more remote device E2E bearers.

Another aspect of the disclosure provides a network entity for wireless communication. The network entity includes a transceiver configured for wireless communication, a memory, and a processor coupled with the transceiver and the memory. The processor and the memory are configured to establish one or more end-to-end (E2E) bearers between the network entity and one or more remote devices via a relay UE. The processor and the memory are further configured to receive, from the relay UE, a buffer status report (BSR) for requesting communication resources. The BSR includes information for at least one of identifying the one or more remote devices or the one or more E2E bearers. The processor and the memory are further configured to determine resource allocation information for the one or more E2E bearers based on the BSR.

Another aspect of the disclosure provides a user equipment (UE) for wireless communication. The UE includes means for establishing direct link communication between the UE and one or more remote devices for relaying one or more remote device end-to-end (E2E) bearers between the one or more remote devices and a network entity. The UE further includes means for multiplexing the one or more remote device E2E bearers to one or more device-to-network (D2N) logical channels between the UE and the network entity. The UE further includes means for receiving resource allocation information from the network entity. The UE further includes means for allocating, based on the resource allocation information, communication resources to the one or more remote devices E2E bearers in consideration of at least in part a quality of service (QoS) requirement of the one or more remote device E2E bearers.

Another aspect of the disclosure provides a relay user equipment (UE) for wireless communication. The relay UE includes means for establishing one or more direct link connections between the relay UE and one or more remote devices for relaying one or more remote device end-to-end (E2E) bearers between the one or more remote devices and a network entity. The relay UE further includes means for transmitting a first buffer status report (BSR) to the network entity for requesting communication resources from the network entity. The first BSR includes information for at least one of identifying the one or more remote devices or the one or more remote device E2E bearers.

Another aspect of the disclosure provides a network entity for wireless communication. The network entity includes means for establishing one or more end-to-end (E2E) bearers between the network entity and one or more remote devices via a relay UE. The network entity further includes means for receiving, from the relay UE, a buffer status report (BSR) for requesting communication resources. The BSR includes information for at least one of identifying the one or more remote devices or the one or more E2E bearers. The network entity further includes means for determining a resources allocation for the one or more E2E bearers based on the BSR.

Another aspect of the disclosure provides a computer-readable storage medium stored with executable code for wireless communication. The executable code includes instructions for causing a user equipment (UE) to establish direct link communication between the UE and one or more remote devices for relaying one or more remote device end-to-end (E2E) bearers between the one or more remote devices and a network entity. The executable code further includes instructions for causing the UE to multiplex the one or more remote device E2E bearers to one or more device-to-network (D2N) logical channels between the UE and the network entity. The executable code further includes instructions for causing the UE to receive resource allocation information from the network entity. The executable code further includes instructions for causing the UE to allocate, based on the resource allocation information, communication resources to the one or more remote devices E2E bearers in consideration of at least in part a quality of service (QoS) requirement of the one or more remote device E2E bearers.

Another aspect of the disclosure provides a computer-readable storage medium stored with executable code for wireless communication. The executable code includes instructions for causing a relay user equipment (UE) to establish one or more direct link connections between the relay UE and one or more remote devices for relaying one or more remote device end-to-end (E2E) bearers between the one or more remote devices and a network entity. The executable code further includes instructions for causing the relay UE to transmit a first buffer status report (BSR) to the network entity for requesting communication resources from the network entity. The first BSR includes information for at least one of identifying the one or more remote devices or the one or more remote device E2E bearers.

Another aspect of the disclosure provides a computer-readable storage medium stored with executable code for wireless communication. The executable code includes instructions for causing a network entity to establish one or more end-to-end (E2E) bearers between the network entity and one or more remote devices via a relay UE. The executable code further includes instructions for causing the network entity to receive, from the relay UE, a buffer status report (BSR) for requesting communication resources. The BSR includes information for at least one of identifying the one or more remote devices or the one or more E2E bearers. The executable code further includes instructions for causing the network entity to determine a resources allocation for the one or more E2E bearers based on the BSR.

These and other aspects of the invention will become more fully understood upon a review of the detailed description, which follows. Other aspects and features will become apparent to those of ordinary skill in the art, upon reviewing the following description of specific, exemplary implementations in conjunction with the accompanying figures. While features may be discussed relative to certain examples and figures below, all implementations can include one or more of the advantageous features discussed herein. In other words, while one or more examples may be discussed as having certain advantageous features, one or more of such features may also be used in accordance with the various examples discussed herein. In a similar fashion, while examples may be discussed below as device, system, or method implementations, it should be understood that such examples can be implemented in various devices, systems, and methods.

BRIEF DESCRIPTION OF THE DRAWINGS

FIGS. 10-13 are schematic illustrations of exemplary short Relay-BSR formats according to some aspects of the disclosure.

FIG. 14 is a schematic illustration of an exemplary long Relay-BSR format according to some aspects of the disclosure.

FIG. 17 is a flow chart illustrating an exemplary resource allocation procedure for relaying remote UE traffic according to some aspects of the disclosure.

FIG. 18 is a flow chart illustrating an exemplary buffer status reporting (BSR) procedure for relaying remote UE traffic according to some aspects of the disclosure.

FIG. 20 is a flow chart illustrating an exemplary resource allocation procedure using Relay-BSR according to some aspects of the disclosure.

DETAILED DESCRIPTION

Figure 1:
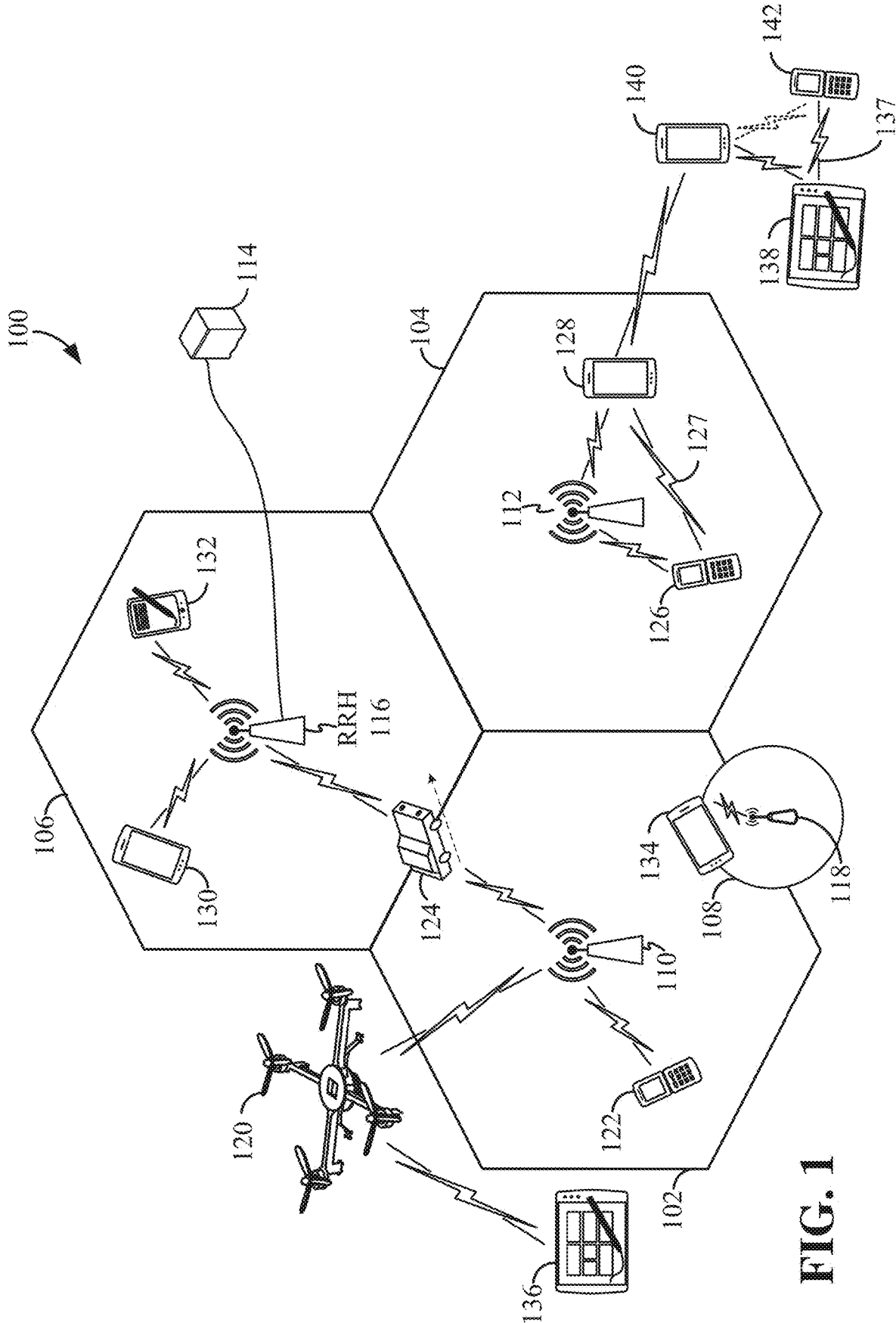
FIG. 1 is an illustration of an example of a radio access network according to some aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Various aspects of the disclosure relate to remote traffic relaying operations in wireless communication. In some examples, a relay user equipment (UE) can communicate with a remote UE through a direct link. Some examples of direct link are device-to-device (D2D), sidelink, Bluetooth, Wi-Fi, ProSec, etc. When the relay UE is in coverage of a network node (e.g., a base station, gNode B (gNB)), the relay UE can relay communication between one or more remote UEs and the network node. In some examples, the relay UE and the remote UE can directly communicate with each other using a direct link via a PC5 interface. The remote UE can establish one or more end-to-end (E2E) radio bearers (RBs) with the network node through the relay UE. To that end, multiple remote UE E2E bearers or PC5 logical channels for sidelink communication can be multiplexed into one or more logical channel groups (LCGs) between the relay UE and the network node. In some aspects, the relay UE and/or network node can allocate resources to the remote UEs in consideration of the E2E bearer quality of service (QoS). In some aspects, the relay UE can provide the network node with an enhanced buffer status report (BSR) that provides information on the remote UEs and E2E bearers.

While aspects and examples are described in this application by illustration to some examples, those skilled in the art will understand that additional implementations and use cases may come about in many different arrangements and scenarios. Innovations described herein may be implemented across many different platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described implementations. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitutions.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a radio access network (RAN) 100. The RAN 100 may implement any suitable wireless communication technology or technologies to provide radio access to a mobile apparatus. As one example, the RAN 100 may operate according to $3^{rd}$ Generation Partnership Project (3GPP) New Radio (NR) specifications, often referred to as 5G or NR. As another example, the RAN 100 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates cells 102, 104, 106, and 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 100 operates according to both the LTE and 5G NR standards, one of the base stations may be an LTE base station, while another base station may be a 5G NR base station.

Various base station arrangements can be utilized. For example, in FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the cell 108 which may overlap with one or more macrocells. In this example, the cell 108 may be referred to as a small cell (e.g., a microcell, picocell, femtocell, home base station, home Node B, home eNode B, etc.), as the base station 118 supports a cell having a relatively small size as compared to a macrocell. Cell sizing can be done according to system design as well as component constraints.

It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes an unmanned aerial vehicle (UAV) 120, which may be a drone or quadcopter. The UAV 120 may be configured to function as a base station, or more specifically, as a mobile base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move and maybe stationary. The term mobile apparatus or mobile device broadly refers to a diverse array of devices and technologies. For example, some non-limiting examples of a mobile apparatus include a mobile, a cellular (cell) phone, a smartphone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicles, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smartwatch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In some examples, the UAV 120 (e.g., the quadcopter) can be a mobile network node and may be configured to function as a UE. For example, the UAV 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, mini-slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 millisecond (ms). Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 138, 140, and 142) may communicate with each other using direct link or D2D (e.g., sidelink) signals 137 without relaying that communication through a base station. In some examples, the UEs 138, 140, and 142 may each function as a scheduling entity or transmitting sidelink device and/or a scheduled entity or a receiving sidelink device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate direct link signals 127 over a direct link (e.g., sidelink) without conveying that communication through the base station 112. In this example, the base station 112 may allocate resources to the UEs 126 and 128 for the sidelink communication. In either case, such sidelink signaling 127 and 137 may be implemented in a peer-to-peer (P2P) network, a device-to-device (D2D) network, a vehicle-to-vehicle (V2V) network, a vehicle-to-everything (V2X) network, an Internet of Everything (IoT) network, a mesh network, or other suitable direct link networks.

In some examples, a D2D relay framework may be included within a cellular network to facilitate relaying of communication to/from a network node (e.g., the base station 112) via D2D links (e.g., sidelinks 127 or 137). For example, one or more UEs (e.g., UE 128) within the coverage area of the base station 112 may operate as relaying UEs to extend the coverage of the base station 112, improve the transmission reliability to one or more UEs (e.g., UEs 126 and 140), and/or allow the base station to recover from a failed UE link due to, for example, blockage or fading.

The sidelink communication between UEs 126 and 128 may occur over a sidelink 127 utilizing a proximity service (ProSe) PC5 interface. The PC5 interface may be utilized to support D2D sidelink communication in V2V and V2X networks, along with various other D2D proximity use cases. Examples of other proximity use cases include, but are not limited to, public safety or commercial (e.g., entertainment, education, office, medical, and/or interactive) based proximity services. ProSe communication may further support different operational scenarios, such as in-coverage, out-of-coverage, and partial coverage. Out-of-coverage refers to a scenario in which one or more UEs are outside of the coverage area of a base station (e.g., base station 112), but each are still configured for ProSe communication. Partial coverage refers to a scenario in which some of the UEs are outside of the coverage area of the base station, while other UEs are in communication with the base station. In-coverage refers to a scenario, as shown in FIG. 1, in which UEs (e.g., UEs 126 and 128) are in communication with the base station 112 (e.g., gNB) via a Uu (e.g., cellular interface) connection to receive ProSe service authorization and provisioning information to support ProSe operations. ProSe communication may utilize a licensed spectrum or an unlicensed spectrum.

In some aspects, a direct link may be a sidelink (e.g., using PC5 interface), Bluetooth, Wi-Fi, or other suitable D2D or P2P link. For example, UEs 138, 140, and 142 may be D2D or P2P devices (e.g., Bluetooth, Zigbee, Wi-Fi, or Near Field Communication (NFC) devices) communicating over a direct link (e.g., a D2D or P2P carrier). For example, UEs 138, 140, and 142 may be Bluetooth devices that communicate over a short-wavelength (e.g., 2.45 GHz) carrier. Each Bluetooth device 138, 140, and 142 may operate at low power (e.g., 100 mW or less) to communicate over a short-range distance (e.g., 10 meters or less). In a Bluetooth network, the UEs 138, 140, and 142 may form an ad-hoc piconet, and each pair of UEs (e.g., UEs 138 and 140; UEs 138 and 142; and UEs 140 and 142) may communicate over a different frequency in a frequency-hopping manner. Within the piconet, one of the UEs (e.g., UE 138) may function as the master, while the other UEs (e.g., UEs 140 and 142) function as slaves. Each of the UEs 138, 140, and 142 may automatically detect and connect to one another.

In the RAN 100, the ability for a UE to communicate while moving, independent of its location, is referred to as mobility. The various physical channels between the UE and the radio access network are generally set up, maintained, and released under the control of an access and mobility management function (AMF), which may include a security context management function (SCMF) and a security anchor function (SEAF) that perform authentication. The SCMF can manage, in whole or in part, the security context for both the control plane and the user plane functionality.

In various aspects of the disclosure, the RAN 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells.

During this time, if the UE moves from one cell to another, or if the signal quality from a neighboring cell exceeds that from the serving cell for a given amount of time, the UE may undertake a handoff or handover from the serving cell to the neighboring (target) cell. For example, UE 124 (illustrated as a vehicle, although any suitable form of UE may be used) may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs), and unified Physical Broadcast Channels (PBCH)). The UEs 122, 124, 126, 128, 130, and 132 may receive the unified synchronization signals, derive the carrier frequency and slot timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the RAN 100. Each of the cells may measure the strength of the pilot signal, and the radio access network (e.g., one or more of the base stations 110 and 114/116 and/or a central node within the core network) may determine a serving cell for the UE 124. As the UE 124 moves through the radio access network 100, the network may continue to monitor the uplink pilot signal transmitted by the UE 124. When the signal strength or quality of the pilot signal measured by a neighboring cell exceeds that of the signal strength or quality measured by the serving cell, the network may hand over the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next-generation communication networks enables the uplink-based mobility framework and improves the efficiency of both the UE and the network, since the number of mobility messages that need to be exchanged between the UE and the network may be reduced.

In various implementations, the air interface in the RAN 100 may utilize licensed spectrum, unlicensed spectrum, or shared spectrum. Licensed spectrum provides for the exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times, the channel is dedicated for transmissions in one direction, while at other times, the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Further, the air interface in the RAN 100 may utilize one or more multiplexing and multiple access algorithms to enable simultaneous communication of the various devices. For example, 5G NR specifications provide multiple access for UL transmissions from UEs 122 and 124 to base station 110, and for multiplexing for DL transmissions from base station 110 to one or more UEs 122 and 124, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 2. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 2:
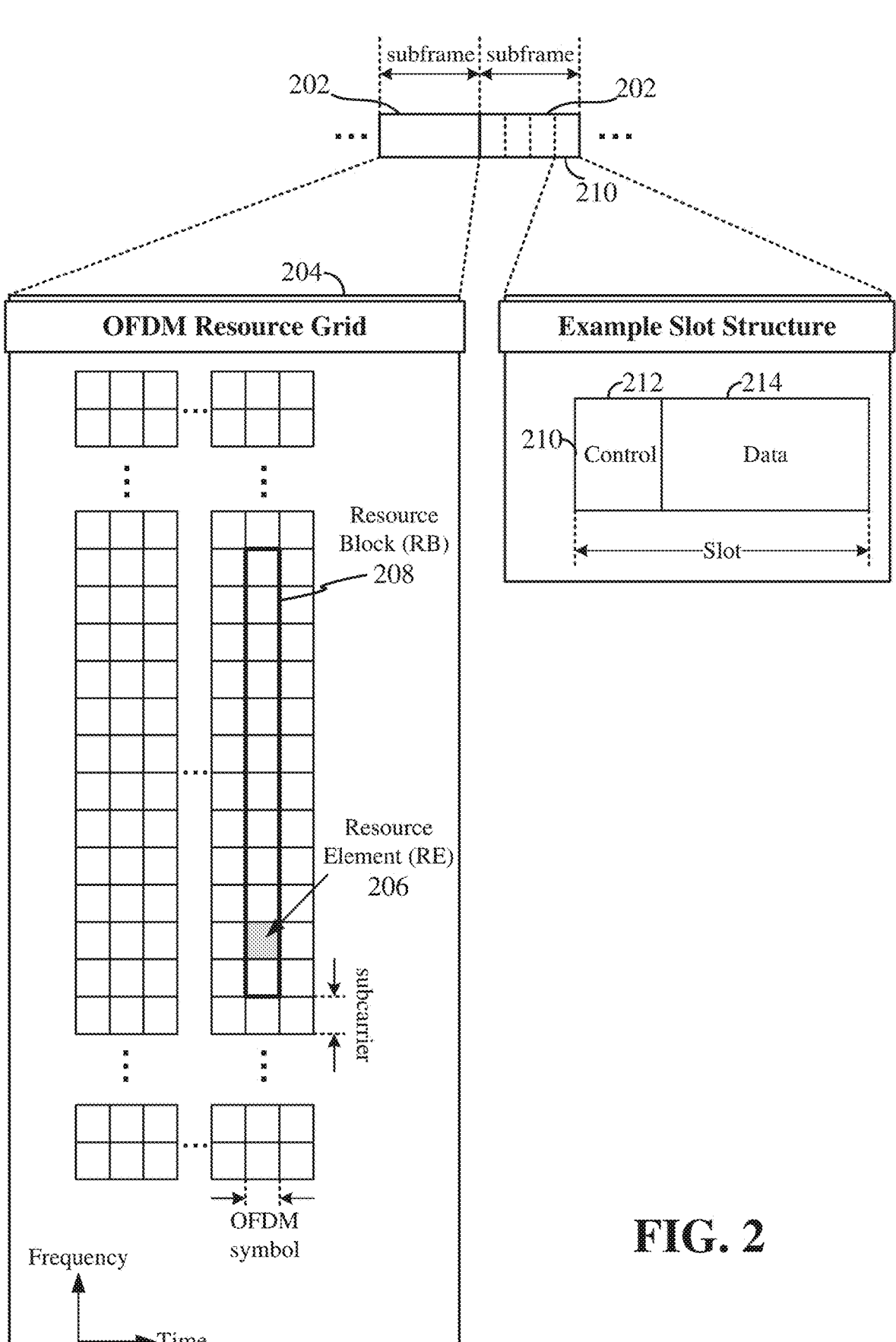
FIG. 2 is a schematic illustration of an organization of wireless resources in an air interface utilizing orthogonal frequency divisional multiplexing (OFDM) according to some aspects of the disclosure.

Referring now to FIG. 2, an expanded view of an exemplary subframe 202 is illustrated, showing an OFDM resource grid. However, as those skilled in the art will readily appreciate, the physical layer (PHY) transmission structure for any particular application may vary from the example described here, depending on any number of factors. Here, time is in the horizontal direction with units of OFDM symbols; and frequency is in the vertical direction with units of subcarriers of the carrier.

The resource grid 204 may be used to schematically represent time-frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 208 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 206 within one or more sub-bands or bandwidth parts (BWPs). Thus, a UE generally utilizes only a subset of the resource grid 204. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a network entity, such as a base station (e.g., gNB, eNB, etc.), or may be self-scheduled by a UE implementing D2D sidelink communication.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

Each 1 ms subframe 202 may consist of one or multiple adjacent slots. In the example shown in FIG. 2, one subframe 202 includes four slots 210, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 210 illustrates the slot 210 including a control region 212 and a data region 214. In general, the control region 212 may carry control channels, and the data region 214 may carry data channels. Of course, a slot may contain all DL, all UL, or at least one DL portion and at least one UL portion. The structure illustrated in FIG. 2 is merely exemplary in nature, and different slot structures may be utilized, and may include one or more of each of the control region(s) and data region(s).

Although not illustrated in FIG. 2, the various REs 206 within a RB 208 may be scheduled to carry one or more physical channels, including control channels, shared channels, data channels, etc. Other REs 206 within the RB 208 may also carry pilots or reference signals. These pilots or reference signals may provide for a receiving device to perform channel estimation of the corresponding channel, which may enable coherent demodulation/detection of the control and/or data channels within the RB 208.

In some examples, the slot 210 may be utilized for broadcast, multicast, groupcast, or unicast communication. For example, a broadcast, multicast, or groupcast communication may refer to a point-to-multipoint transmission by one device (e.g., a base station, UE, or other similar devices) to other devices. Here, a broadcast communication is delivered to all devices, whereas a multicast or groupcast communication is delivered to multiple intended recipient devices. A unicast communication may refer to a point-to-point transmission by one device to a single other device.

In an example of cellular communication over a cellular carrier via a Uu interface, for a DL transmission, the network entity (e.g., a base station) may allocate one or more REs 206 (e.g., within the control region 212) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed-loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 206 (e.g., in the control region 212 or the data region 214) to carry other DL signals, such as a demodulation reference signal (DMRS); a phase-tracking reference signal (PT-RS); a channel state information (CSI) reference signal (CSI-RS);

and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 206 to carry UL control information (UCI) including one or more UL control channels, such as a physical uplink control channel (PUCCH), to the network entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., a request for the network entity to schedule uplink transmissions. Here, in response to the SR transmitted on the UCI, the network entity may transmit downlink control information (DCI) that may schedule resources for uplink packet transmissions. UCI may also include HARQ feedback, channel state feedback (CSF), such as a CSI report, or any other suitable UCI.

In some aspects, a UE can transmit a buffer status report (BSR) to provide the base station with information regarding the volume of uplink data waiting to be transferred. A BSR can be sent on the physical uplink shared channel (PUSCH) using a medium access control (MAC) control element (CE). The provision of a BSR helps the base station to allocate an appropriate quantity of air-interface resources (e.g., RBs 208).

In addition to control information, one or more REs 206 (e.g., within the data region 214) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 206 within the data region 214 may be configured to carry other signals, such as one or more SIBs and DMRSs.

In some aspects, the REs 206 can be used by UEs for direct link or sidelink communication. In an example of direct link communication over a sidelink carrier via a ProSe PC5 interface, the control region 212 of the slot 210 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 214 of the slot 210 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 206 within slot 210. For example, HARQ feedback information may be transmitted in a physical sidelink feedback channel (PSFCH) within the slot 210 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 210.

In some examples, sidelink (e.g., PC5) communication may be scheduled by use of SCI. SCI may include two SCI stages. Stage 1 sidelink control information (first stage SCI) may be referred to herein as SCI-1. Stage 2 sidelink control information (second stage SCI) may be referred to herein as SCI-2.

SCI-1 may be transmitted on a PSCCH. SCI-1 may include information for resource allocation of a sidelink resource and for decoding of the second stage of sidelink control information (i.e., SCI-2). SCI-1 may further identify a priority level (e.g., Quality of Service (QoS)) of a PSSCH. For example, ultra-reliable-low-latency communication (URLLC) traffic may have a higher priority than text message traffic (e.g., short message service (SMS) traffic). SCI-1 may also include a PSSCH resource assignment and a resource reservation period (if enabled). Additionally, SCI-1 may include a PSSCH demodulation reference signal (DMRS) pattern (if more than one pattern is configured). The DMRS may be used by a receiver for radio channel estimation for demodulation of the associated physical channel. As indicated, SCI-1 may also include information about the SCI-2, for example, SCI-1 may disclose the format of the SCI-2. Here, the format indicates the resource size of SCI-2 (e.g., a number of REs that are allotted for SCI-2), a number of a PSSCH DMRS port(s), and a modulation and coding scheme (MCS) index. In some examples, SCI-1 may use two bits to indicate the SCI-2 format. Thus, in this example, four different SCI-2 formats may be supported. SCI-1 may include other information that is useful for establishing and decoding a PSSCH resource.

SCI-2 may be transmitted on the PSSCH and may contain information for decoding the PSSCH. According to some aspects, SCI-2 includes a 16-bit layer 1 (L1) destination identifier (ID), an 8-bit L1 source ID, a hybrid automatic repeat request (HARQ) process ID, a new data indicator (NDI), and a redundancy version (RV). For unicast communications, SCI-2 may further include a CSI report trigger. For groupcast communications, SCI-2 may further include a zone identifier and a maximum communication range for NACK. SCI-2 may include other information that is useful for establishing and decoding a PSSCH resource.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIGS. 1 and 2 are not necessarily all of the channels or carriers that may be utilized between devices, and those of ordinary skill in the art will recognize that other channels or carriers may be utilized in addition to those illustrated, such as other traffic, control, and feedback channels.

Figure 3:
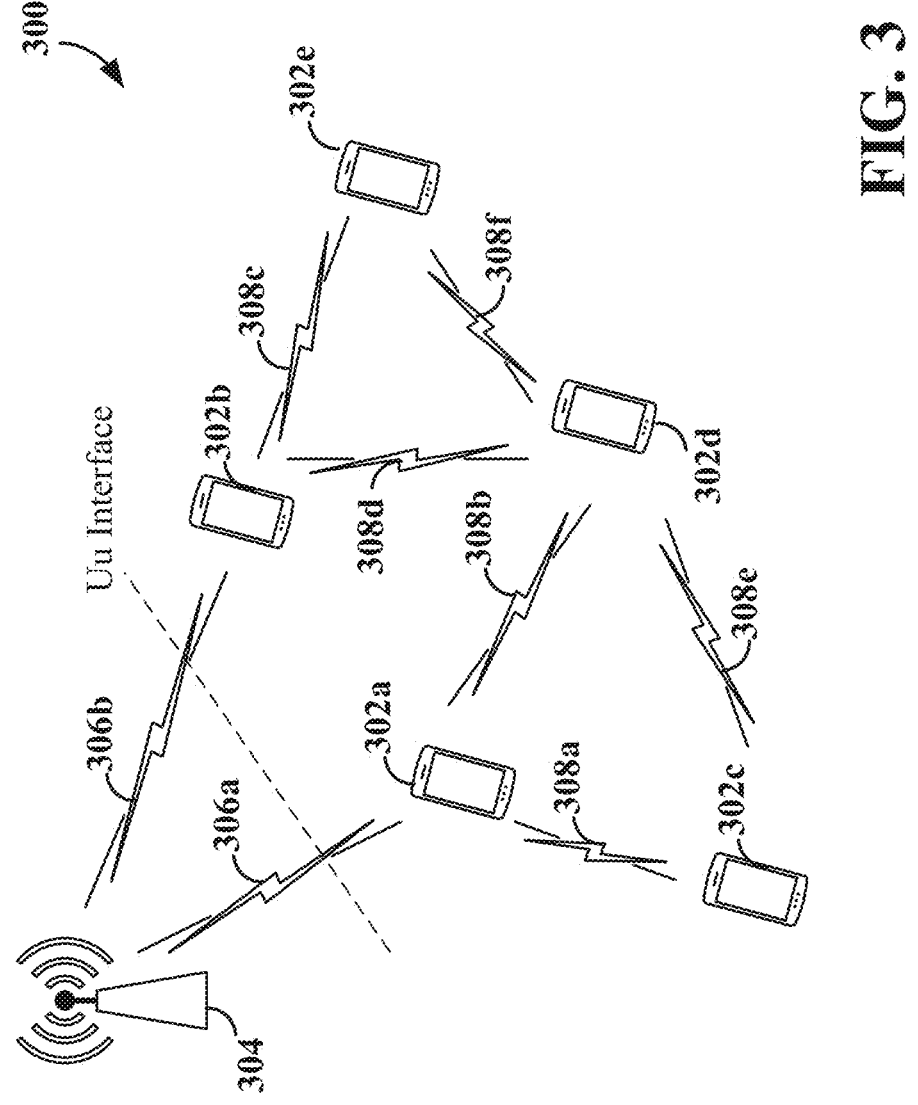
FIG. 3 is a schematic illustration of an exemplary wireless communication network employing sidelink relaying according to some aspects of the disclosure.

FIG. 3 is a diagram illustrating an exemplary wireless communication network 300 employing D2D or sidelink relaying communication. The wireless communication network 300 may correspond, for example, to the RAN 100 illustrated in FIG. 1. The wireless communication network 300 may include a network entity (e.g., a base station, eNB, or gNB) 304 in wireless communication with one or more wireless communication devices (e.g., UEs) 302a, 302b, 302c, 302d, and 302e. In the example shown in FIG. 3, the network entity 304 may communicate with at least UEs 302a and 302b via a respective Uu interface (e.g., wireless communication link 306a and 306b). In some examples, the network entity 304 may further have a communication link (Uu) with one or more of remote UEs (e.g., UEs 302c, 302d, and/or 302e). Each of the Uu wireless communication links 306a and 306b may utilize a sub-6 GHz carrier frequency or a mmWave carrier frequency. In some examples, one or more UEs (e.g., UEs 302c, 302d, and 302d) may not have a Uu interface with the network entity 304.

In addition, respective D2D relay links (sidelinks over PC5 interface) 308a-308f may be established between the UEs 302a-302e to enable relaying of information between the network entity 304 and one or more remote UEs, such as UEs 302c-302e, or between a remote UE (e.g., UE 302e) and a destination UE (e.g., UE 302c). For example, relay link 308a may be established between UE 302c and UE 302a, relay link 308b may be established between UE 302d and UE 302a, relay link 308c may be established between UE 302e and 302b, relay link 308d may be established between UE 302d and UE 302b, relay link 308e may be established between UE 302c and UE 302d, and relay link 308f may be established between UE 302d and UE 302e. Each relay link 308a-308f may utilize decode and forward (DF) relaying, amplify and forward (AF) relaying, or compress and forward (CF) relaying. For DF relaying, HARQ feedback may be provided from the receiving device to the transmitting device. The sidelink communication over the relay links 308a-308d may be carried, for example, in a licensed frequency domain using radio resources operating according to a 5G NR or NR sidelink (SL) specification and/or in an unlicensed frequency domain, using radio resources operating according to 5G new radio-unlicensed (NR-U) specifications.

The relay links 308a-308f may be established due to, for example, distance or signal blocking between the network entity 304 (or destination UE) and a remote UE (e.g., UE 302c, UE 302d, UE 302e), weak receiving capability of the remote UE, low transmission power of the remote UE, limited battery capacity of the remote UE, and/or link diversity improvement. Thus, the relay links 308a-308f may enable communication between the network entity 304 and a remote UE (e.g., UE 302e) to be relayed via one or more relay UEs (e.g., UEs 302a-302d) over wireless communication links 306a and 306b (e.g., via Uu interface) and relay links (e.g., sidelinks) 308a-308f. In other examples, the relay links 308a-308f may enable sidelink communication to be relayed between a first remote UE 302e and a second remote UE (e.g., UE 302c) over various relay links (relay links 308e and 3800.

In some examples, a common carrier may be shared between the sidelinks 308a-308f and Uu links 306a and 306*b*, such that resources on the common carrier may be allocated for both sidelink communication between wireless communication devices 302*a*-302*e* and cellular communication (e.g., uplink and downlink communication) between the wireless communication devices 302*a*-302*e* and the network entity 304. For example, the wireless communication network 300 may be configured to support a Mode 1 sidelink network in which resources for both sidelink and cellular communication are scheduled by the network entity 304 (e.g., a base station or gNB). In other examples, the wireless communication network 300 may be configured to support a Mode 2 sidelink network in which the wireless communication devices 302*a*-302*e* may autonomously select sidelink resources (e.g., from one or more frequency bands or sub-bands designated for sidelink communication) for the sidelinks 308*a*-308*f*. In some examples, a remote UE (e.g., UE 302*e*) or other scheduling entity (e.g., UE 302*a*) may select the sidelink resources for relaying communication between the remote UE 302*e* and other relay UEs 302*a*-302*d*. In examples in which the relay communication is between the remote UE 302*e* and a destination UE (e.g., UE 302*c*), the sidelink resources for relaying may be selected by the network entity 304 in a Mode 1 configuration or by the remote UE 302*e* or the destination UE 302*c* in a Mode 2 configuration.

A remote UE (e.g., UE 302*d*) may generally connect to a source relay UE (e.g., UE 302*a*) via a layer 3 (L3) connection with no Uu connection with (and no visibility to) the network or via a layer 2 (L2) connection where the remote UE supports Uu access stratum (AS) and non-AS connections (NAS) with the network. When there is no direct connection path (via Uu interface) between the remote UE and the network entity (e.g., an L3 connection), the remote UE is connected to the relay UE via a PC5 connection only (e.g., Layer 3 UE-to-NW). In this example, the relay UE may report to the 5G core network (5GC) about the remote UE's presence. In other examples, the remote UE may be visible to the 5GC via a non-3GPP interworking function (N3IWF). When there is a connection path (e.g., an L2 connection) between the remote UE and the network entity, the remote UE may support the NR Uu AS and NAS connections above the PC5 radio link control (RLC) layer. The NG-RAN (e.g., network entity 304) may control the remote UE's PC5 link via NR radio resource control (RRC) signaling. Various aspects discussed herein are directed to an L2 relay connection between the remote UE and the network entity.

Figure 4:
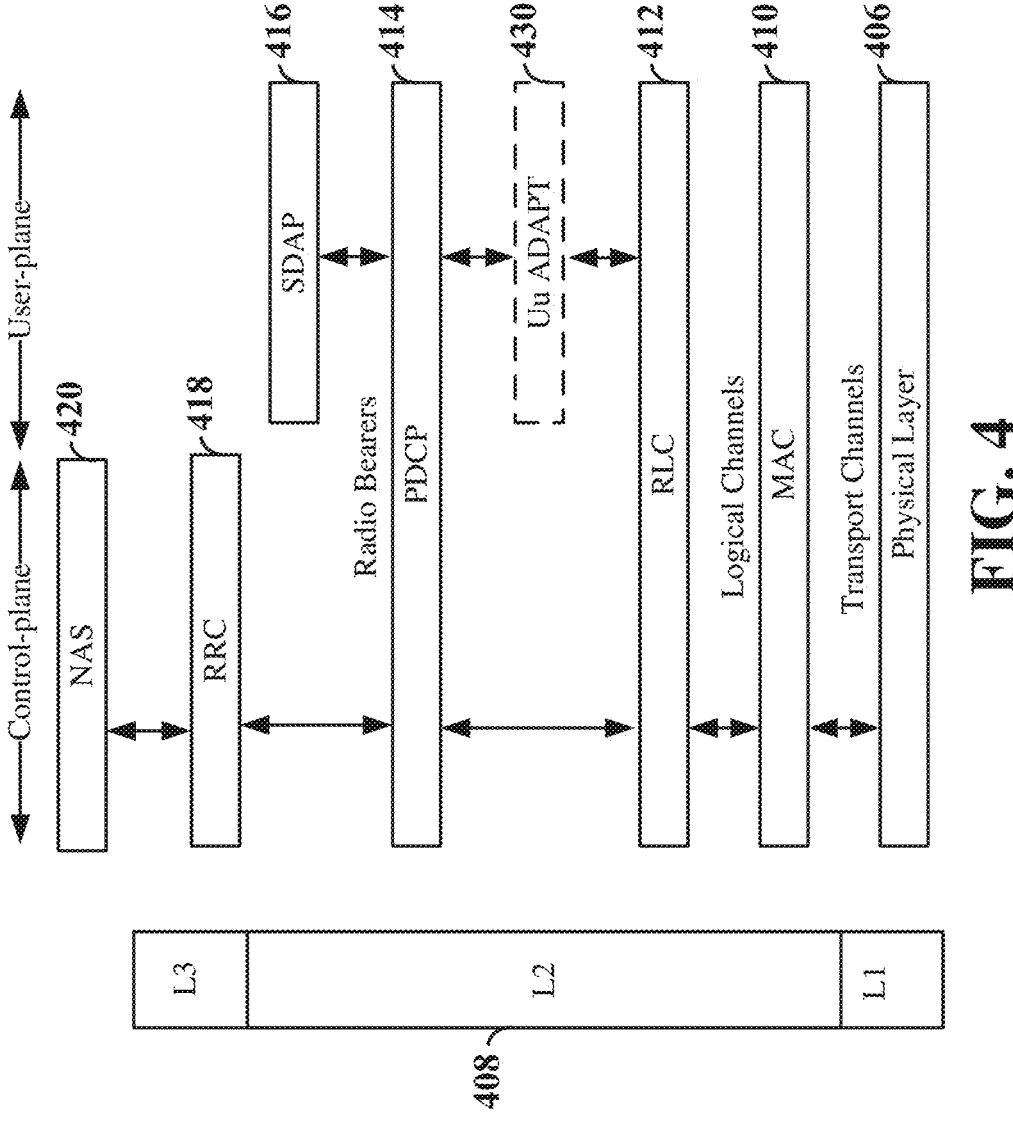
FIG. 4 is a schematic illustration of a radio protocol architecture according to some aspects of the disclosure.

The radio protocol architecture for a radio access network, such as the RAN 100 shown in FIG. 1 may take on various forms depending on the particular application. An example of a radio protocol architecture for the user and control planes is illustrated FIG. 4. As illustrated in FIG. 4, the radio protocol architecture for the UE and the base station includes three layers: layer 1 (L1), layer 2 (L2), and layer 3 (L3). L1 is the lowest layer and implements various physical layer signal processing functions. L1 will be referred to herein as the physical layer (PHY) 406. L2 408 is above the physical layer 406 and is responsible for the link between the UE and base station over the physical layer 406.

In the user plane, the L2 layer 408 includes a media access control (MAC) layer 410, a radio link control (RLC) layer 412, a packet data convergence protocol (PDCP) 414 layer, and a service data adaptation protocol (SDAP) layer 416, which are terminated at the base station on the network side. Although not shown, the UE may have several upper layers above the L2 layer 408 including at least one network layer (e.g., Internet Protocol (IP) layer and user data protocol (UDP) layer) that is terminated at the User Plane Function (UPF) on the network side and one or more application layers.

The SDAP layer 416 provides a mapping between a 5G core (5GC) quality of service (QoS) flow and a data radio bearer and performs QoS flow ID marking in both downlink and uplink packets. The PDCP layer 414 provides packet sequence numbering, in-order delivery of packets, retransmission of PDCP protocol data units (PDUs), and transfer of upper layer data packets to lower layers. PDU's may include, for example, Internet Protocol (IP) packets, Ethernet frames and other unstructured data (i.e., Machine-Type Communication (MTC), hereinafter collectively referred to as "packets"). The PDCP layer 414 also provides header compression for upper layer data packets to reduce radio transmission overhead, security by ciphering the data packets, and integrity protection of data packets. A PDCP context may indicate whether PDCP duplication is utilized for a unicast connection.

The RLC layer 412 provides segmentation and reassembly of upper layer data packets, error correction through automatic repeat request (ARQ), and sequence numbering independent of the PDCP sequence numbering. An RLC context may indicate whether an acknowledged mode (e.g., a reordering timer is used) or an unacknowledged mode is used for the RLC layer 412. The MAC layer 410 provides multiplexing between logical and transport channels. The MAC layer 410 is also responsible for allocating the various radio resources (e.g., resource blocks) in one cell among the UEs and for HARQ operations. A MAC context may enable, for example, a HARQ feedback scheme, resource selection algorithms, carrier aggregation, beam failure recovery, or other MAC parameters for a unicast connection. The physical layer 406 is responsible for transmitting and receiving data on physical channels (e.g., within slots). A PHY context may indicate a transmission format and a radio resource configuration (e.g., bandwidth part (BWP), numerology, etc.) for a unicast connection.

In the control plane, the radio protocol architecture for the UE and base station is substantially the same for L1 406 and L2 408 with the exception that there is no SDAP layer in the control plane and there is no header compression function for the control plane. The control plane also includes a radio resource control (RRC) layer 418 in L3 and a higher Non Access Stratum (NAS) layer 420. The RRC layer 418 is responsible for establishing and configuring signaling radio bearers (SRBs) and data radio bearers (DRBs) between the base station the UE, paging initiated by the 5GC or NG-RAN, and broadcast of system information related to Access Stratum (AS) and Non Access Stratum (NAS). The RRC layer 418 is further responsible for QoS management, mobility management (e.g., handover, cell selection, inter-RAT mobility), UE measurement and reporting, and security functions. The NAS layer 420 is terminated at the AMF in the core network and performs various functions, such as authentication, registration management, and connection management.

In some aspects, the radio protocol architecture may include a Uu adaptation layer 430 between the PDCP layer and RLC layer to support Layer 2 (L2) UE-to-network relay functions. For example, the Uu adaptation layer 430 at a relay UE can support UL bearer mapping for relaying between ingress direct link RLC channels (e.g., via a PC5 interface) and egress Uu RLC channels over the relay UE Uu interface (UE-to-network air interface). For relaying uplink traffic, different end-to-end RBs (e.g., SRB, DRB) of the same remote UE and/or different remote UEs can be subject to many-to-one (N:1) mapping and data multiplexing over one Uu RLC channel. In some aspects, the Uu adaptation layer can support remote UE identification for the UL traffic that multiplexes the data coming from multiple remote UEs. The identity information of remote UE Uu radio bearer and/or remote UE can be provided in the Uu adaptation layer for UL in order for a base station (e.g., gNB) to correlate the received data packets to the specific PDCP entity associated with the correct remote UE Uu RB or a remote UE.

The Uu adaptation layer 430 can also support DL bearer mapping at a base station (e.g., gNB) to map end-to-end radio bearers (e.g., SRB, DRB) of a remote UE into one or more Uu RLC channels over a relay UE Uu interface. The Uu adaptation layer 430 can support DL many-to-one (N:1) bearer mapping and data multiplexing between multiple end-to-end radio bearers (e.g., SRBs, DRBs) of a remote UE and/or different remote UEs and one Uu RLC channel over the relay UE Uu interface.

The Uu adaptation layer 430 can further support remote UE identification for downlink traffic. The identity information of the remote UE Uu radio bearer and the identity information of the remote UE can be put into the Uu adaptation layer by the base station for DL in order for the relay UE to map the received data packets for a remote UE Uu radio bearer to the associated direct link (e.g., RLC channel via PC5). In some aspects, the base station (e.g., gNB) can handle the QoS breakdown over the relay UE Uu interface and remote UE direct link (e.g., PC5) for the end-to-end (E2E) QoS enforcement of a particular protocol data unit (PDU) session or QoS flow established between a remote UE and a base station in case of L2 UE-to-Network relay.

In some aspects, BSR and UL grant can be logical channel group (LCG) based, for example, in Release 16 of the 3GPP specification. A relay UE can use the allocated resources for a particular LCG based on the priority of the Uu logical channel within the LCG without differentiation of remote UE E2E bearers/PC5 RLC channels during resource allocation. Some aspects of the disclosure disclose various implementations of BSR, logical channel prioritization (LCP), and UL/DL grant messages that can support E2E bearer QoS for remote UE traffic within an LCG. In some aspects, the various apparatuses, procedures, processes, methods, and techniques disclosed herein can be applied to sidelink communication using various air interfaces, for example, Bluetooth, Wi-Fi, PC5, and other D2D technologies.

Figure 5:
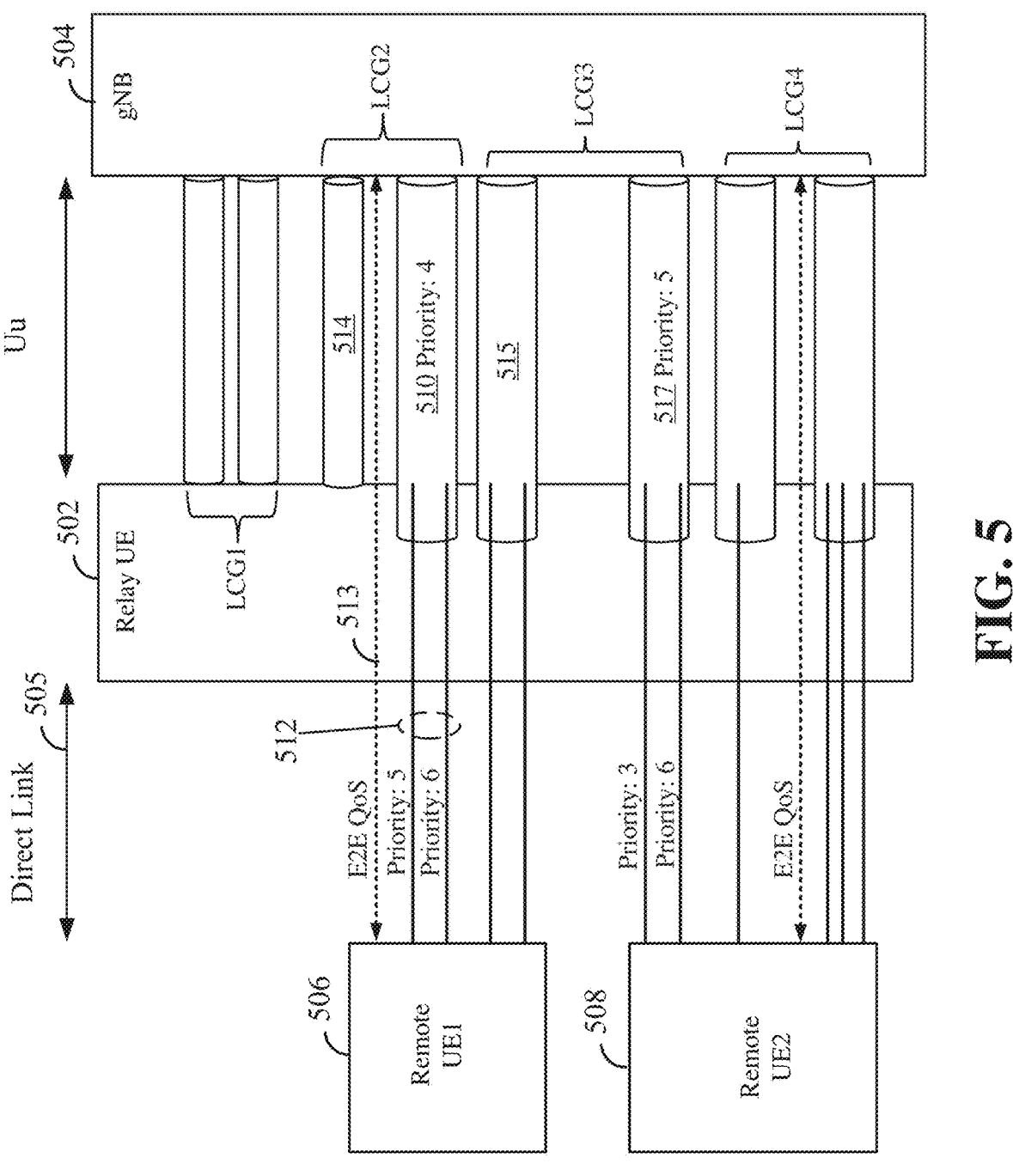
FIG. 5 is a schematic illustration of exemplary direct link logical channels multiplexing on Uu logical channels according to some aspects of the disclosure.

FIG. 5 is a schematic illustration of multiplexing multiple remote UE direct links on a relay UE Uu link according to some aspects of the disclosure. A Uu link is a communication connection between the relay UE and the base station through a Uu interface. A Uu link between the relay UE 502 and a base station (e.g., gNB 504) can carry one or more logical channels (e.g., Uu RLC channels) that can be grouped into one or more logical channel groups (LCGs). The relay UE 502 may be any of the UEs or scheduled entities described above in relation to FIG. 1. The base station 504 can be any of the scheduling entities or base stations (e.g., gNB) described above in relation to FIG. 1.

Four exemplary LCGs (e.g., LCG1, LCG2, LCG3, and LCG4) are illustrated in FIG. 5. The relay UE 502 may have a direct link 505 (e.g., sidelink (PC5), Bluetooth, Wi-Fi, etc.) connection with one or more remote UEs (e.g., remote UEs 506 and 508). Each direct link between the relay UE 502 and a remote UE can include one or more logical channels (e.g., RLC channels via a PC5 interface). In some examples, the relay UE 502 can use one or more dedicated Uu RLC channels (via the Uu interface) for relaying the traffic of each remote UE. In some examples, the relay UE 502 can share one or more Uu RLC channels among multiple remote UEs. A Uu RLC channel can be used to multiplex direct link logical channels (e.g., PC5 RLC channels) of different priority and/or end-to-end QoS needs. In one example, the relay UE 502 can use a Uu RLC channel 510 with a first priority (e.g., priority 4) to multiplex two direct link RLC channels 512 with different respective priorities (e.g., priorities 5 and 6). In one example, the remote UE 506 may have one or more E2E bearers 513 established across the direct link RLC channels 512 and Uu RLC channel 510. An E2E bearer can include a signaling radio bearer (SRB) and/or data radio bearer (DRB).

In one aspect, the relay UE 502 can use separate LCGs (e.g., LCG1 and LCG4) for carrying the communication or traffic of each UE (e.g., relay UE or remote UE). In one aspect, each LCG is used for the traffic or channels of a separate remote UE or the relay UE. In this case, the LCG does not mix the traffic or channels of different UEs. In another aspect, the relay UE 502 can share an LCG (e.g., LCG2 and LCG3) between different UEs, for example, RLC channels (RLC channel 514) of the relay UE and RLC channels (e.g., RLC channel 510) of a remote UE. In one example, the LCG2 is used for the Uu RLC channels 514 of the relay UE and relaying Uu RLC channels 510 of the remote UE 506. In one example, the LCG3 is used for relaying Uu RLC channels 515 and 517 of the remote UEs 506 and 508.

In some aspects, the base station 504 can allocate resources (e.g., RBs 208) to the relay UE 502 based on the LCGs, and the relay UE 502 can allocate the resources of a certain LCG to the associated logical channels (e.g., Uu RLC channels of the relay UE 502 and relaying Uu RLC channels of remote UEs 506 and/or 508) based on the respective priority of the logical channels within the same LCG. In some aspects, the relay UE 502 can transmit a buffer status report (BSR) to trigger the base station 504 to allocate resources (e.g., UL or DL grants) to the relay UE.

In some aspects of the disclosure, the relay UE 502 can transmit different types of BSR to assist the base station 504 in allocating resources in consideration of E2E bearer QoS requirement and/or direct link priorities of remote UEs. In some aspects, the relay UE 502 can use a logical channel prioritization (LCP) procedure to allocate resources of an LCG in consideration of the E2E bearer QoS and/or direct link priorities of remote UEs associated with the LCG.

Logical Channel Prioritization

In some aspects, the base station 504 can send an uplink grant to the relay UE 502 to allocate UL resources. Based on the uplink grant, the relay UE can perform a logical channel prioritization (LCP) procedure to decide on the amount of resources allocated for each logical channel, for example, a Uu RLC channel 514 of the relay UE multiplexed with remote device E2E bearers (e.g., PC5 RLC channels 510). Each Uu logical channel can have an associated priority value (e.g., a higher priority value indicating a lower priority level), a prioritized bit rate (PBR), and a bucket size duration (BSD). The bucket size of a logical channel is equal to the product PBR×BSD, where PBR and BSD can be configured by the base station. The UE also can maintain a variable Bj for each logical channel j. The variable Bj can be initialized to zero when the related logical channel is established, and incremented by the product PBR×T before every instance of the LCP procedure, where T is the time elapsed since Bj was last incremented. If the value of Bj is larger than the bucket size of logical channel j, Bj is set to the bucket size.

The BSD is used to set the maximum amount of pending data allowed for a certain logical channel. The more data a logical channel has, the higher its priority tends to be, but Bj cannot exceed the value set by bucket size. This keeps a logical channel experiencing a very high burst of data from taking over the transmission and blocking out a lower rate channel. The BSD indicates how much time for transmitting uplink data of a logical channel by using the prioritized bit rate until the bucket size is reached, for example, value in milliseconds.

Figure 6:
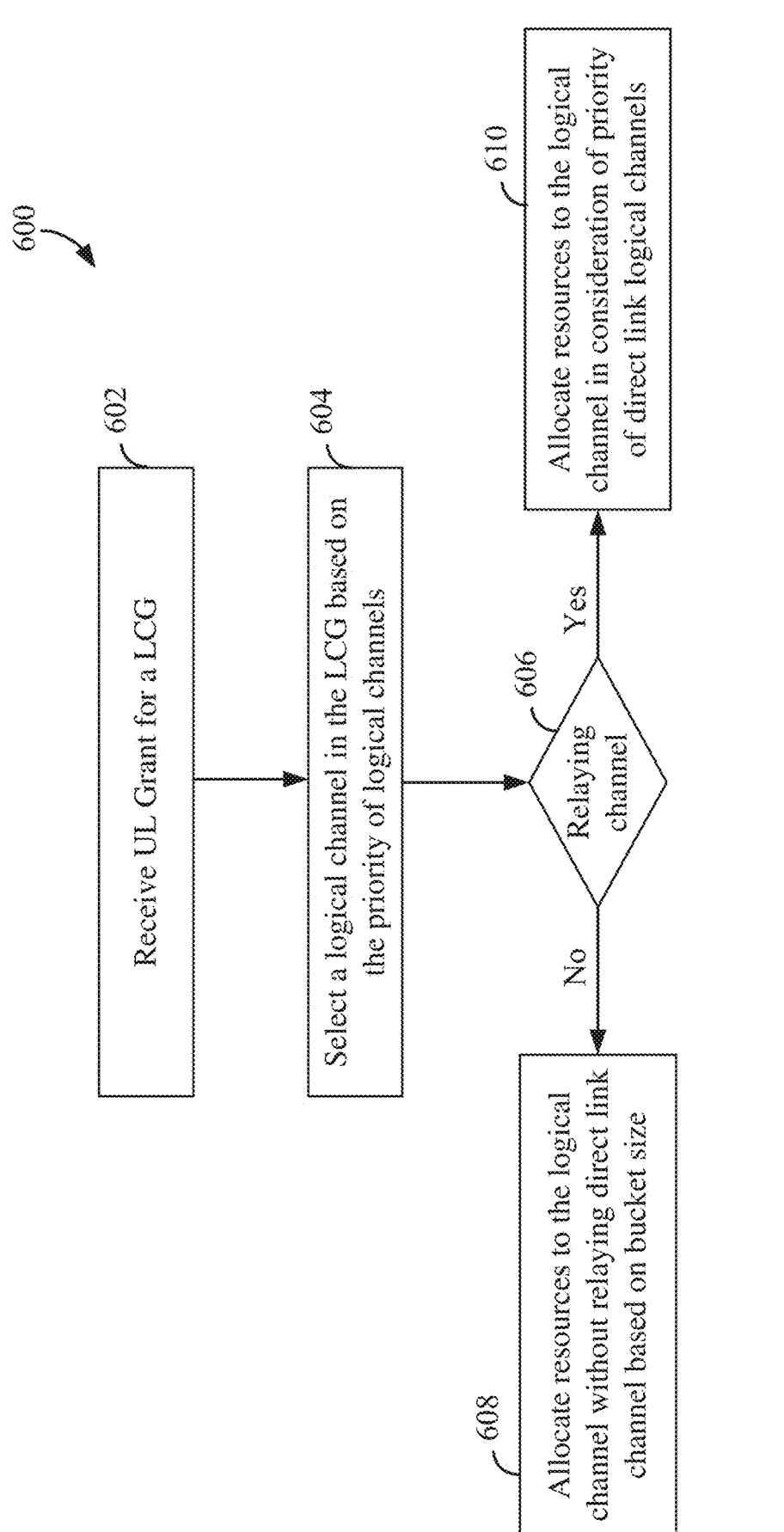
FIG. 6 is a flow chart illustrating a logical channel prioritization (LCP) procedure according to some aspects of the disclosure.

FIG. 6 is a flow chart illustrating an exemplary LCP procedure 600 for LCG-based resource allocation according to some aspects of the disclosure. The procedure 600 may be performed by any of the UEs or scheduled entities in FIGS. 1, 3, and 5 when acting as a relay UE. For ease of reference, FIG. 6 is discussed below with reference to the example shown in FIG. 5.

At block 602, a UE (e.g., relay UE 502) can receive resource allocation information (e.g., UL grant) from a base station (e.g., base station 504 in FIG. 5) for a certain LCG (e.g., LCG1, LCG2, LCG3, or LCG4 in FIG. 5). The relay UE 502 can calculate the respective bucket sizes for the Uu logical channels (LCHs) (e.g., RLC channels 510, 514, and 515) as described above to facilitate resource allocation among the LCHs. For example, the bucket size can be determined as the product of PBR×BSD.

At block 604, the relay UE 502 can select one or more logical channels in the LCG based on the priority of logical channels for the purpose of allocating communication resources to the one or more logical channels. In some aspects, the relay UE can select one or more Uu logical channels in consideration of the mapping (e.g., logical channels to physical channels mapping) restrictions for each Uu logical channel (e.g., Uu RLC channels 510 and 514). Examples of the mapping restrictions can include, but not limited to, allowed subcarrier spacing index, PUSCH transmission duration associated with the UL grant, configured grant type, allowed cell information, etc. In one aspect, the relay UE can follow the Uu resource allocation procedures specified in Release 16 of the 3GPP Technical Specification (TS) 38.321 clause 5.4.3.1.3 to select the logical channels for resource allocation.

In one example, the selected logical channels with their respective Bj>0 can be allocated resources in a decreasing priority order. If the PBR of a logical channel is set to infinity, the MAC entity can allocate resources for all the data that is available for transmission on the logical channel before meeting the PBR of the lower priority logical channel(s). The relay UE can decrement Bj by the total size of MAC service data units (SDUs) served to logical channel j above. If any resources remain, all the selected logical channels can be served in a decreasing priority order (regardless of the value of Bj) until either the data for that logical channel or the UL grant is exhausted, whichever comes first. Logical channels configured with equal priority can be served equally.

At decision block 606, the relay UE 502 can determine whether the selected Uu logical channel relays E2E bearer traffic (e.g., PC5 RLC channel) for one or more remote UEs. For example, the Uu logical channels of LCG1 (see FIG. 5) do not relay any direct link traffic (e.g., sidelink via PC5), and the Uu logical channels of LCG2, LCG3, and LCG4 can relay E2E bearers for remote UEs (e.g., remote UEs 506 and 508).

At block 608, if the selected Uu logical channel does not relay any remote UE E2E bearers, the relay UE 502 can allocate the UL resources to the selected Uu logical channel based on the LCP procedure described above. At block 610, if the selected Uu logical channel is a relaying Uu logical channel that is used to multiplex one or more remote UE E2E bearers (e.g., PC5 RLC channels) from one or more remote UEs, the relay UE 502 can allocate resources of the LCG in consideration of the priority (e.g., PC5 logical channel priority) of the remote UE E2E bearers on the connection between the remote UE and the relay UE.

Figure 7:
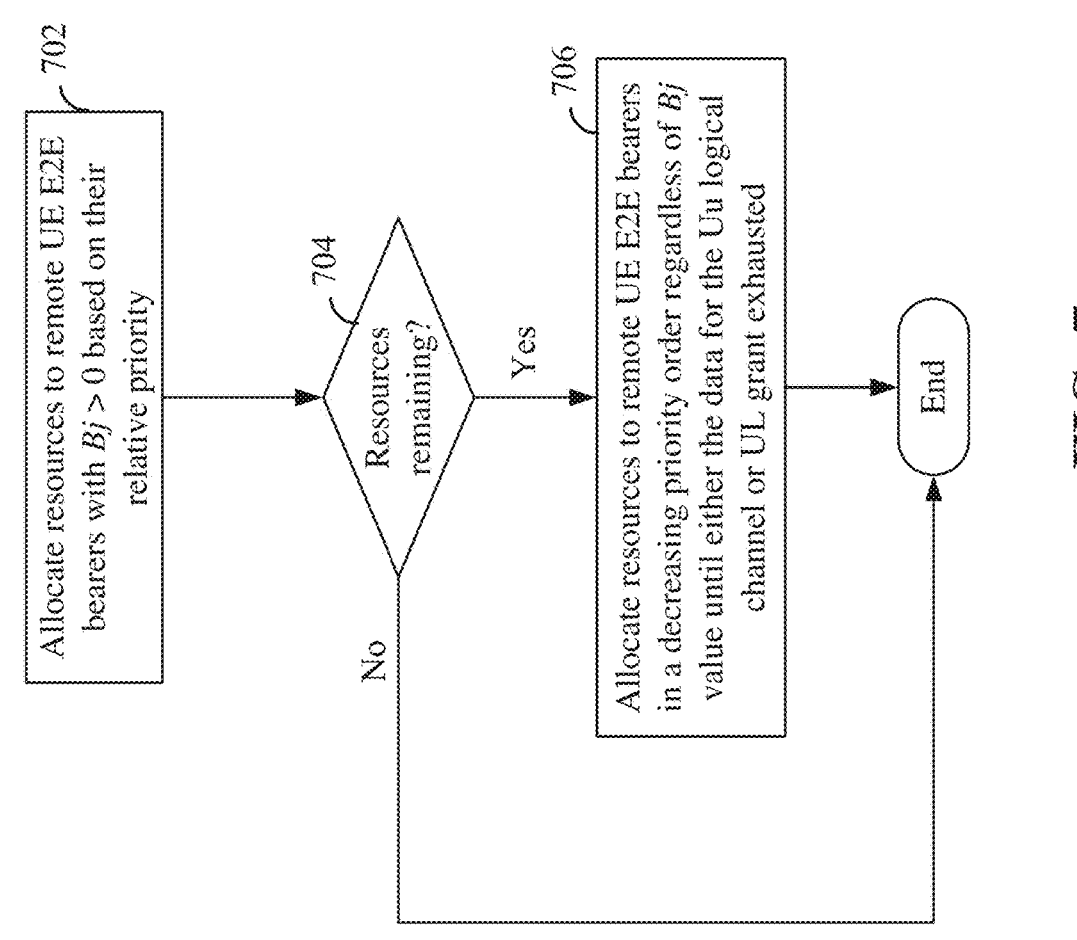
FIG. 7 is a flow chart illustrating an exemplary resource allocation procedure for allocating resources to remote UE E2E bearers according to some aspects of the disclosure.

FIG. 7 is a flow chart illustrating an exemplary resource allocation procedure 700 for allocating resources to remote UE E2E bearers according to some aspects of the disclosure. In some aspects, the relay UE 502 can allocate resources to the remote UE E2E bearers in decreasing priority order that are multiplexed on the Uu logical channel. The relay UE may also maintain respective bucket sizes and variables Bj (that can be incremented and decremented based on data availability and resource availability) for each remote UE E2E bearers over the direct link between the remote UE and the relay UE. At block 702, the relay UE can allocate resources to the remote UE E2E bearers with Bj>0 based on their relative priority. At decision block 704, the relay UE can determine whether any communication resources remains after the above allocation. At block 706, if any resources (e.g., resources granted to a certain LCG) still remain after the above-described allocation procedure, the relay UE can allocate the remaining resources to all the remote UE E2E bearers multiplexed on the same Uu logical channel in a decreasing priority order (regardless of the value of Bj) until either the data for that Uu logical channel or the UL grant is exhausted, whichever comes first. When two or more direct link channels are configured with equal priority, the relay UE can allocate resources to them equally.

Relay Buffer Status Report

In some aspects, the relay UE can be configured to send a buffer status report (BSR) to the base station to request Uu resources (e.g., UL resources via the Uu interface) for the transmission of relay traffic. BSR is a type of MAC control element (CE) that can carry information on how much data is available in a UE buffer for UL transmission. In one aspect, the relay UE can send a Relay-BSR to provide the base station with information regarding the amount of uplink data (e.g., relay data or both Uu and relay data) waiting to be transferred. Based on the Relay-BSR, the base station can allocate an appropriate amount of air-interface resources (e.g., Uu RB s) to the relay UE in consideration of the remote UE E2E bearers QoS. In some aspects, the relay UE can send a Relay-BSR per LCG rather than per logical channel.

In some aspects, the relay UE (e.g., relay UE 502) can transmit a Relay-BSR to assist the base station (e.g., gNB) with scheduling UL resources when the relay UE relays remote UE E2E bearer traffic (e.g., sidelink traffic via a PC5 interface) to the base station. In some examples, the Relay-BSR can include remote UE information such as remote UE identifiers (e.g., IDs) along with the associated buffer size(s). In some aspects, the base station can use new or specific UL and DL grant formats (e.g., DCI formats) that are configured to allow resource allocation per remote UE and/or per remote UE bearer.

In some aspects, the relay UE can be configured to support the Relay-BSR in addition to a normal BSR (Uu-BSR) used for Uu link. In one aspect, the relay UE can use a short Relay-BSR format and a long Relay-BSR format for the Relay-BSR as needed to request for resource grants. The relay UE can determine the BSR type (e.g., Uu-BSR or Relay-BSR) to use for requesting resources for an LCG based on the type of logical channels included in the LCG.

Figure 8:
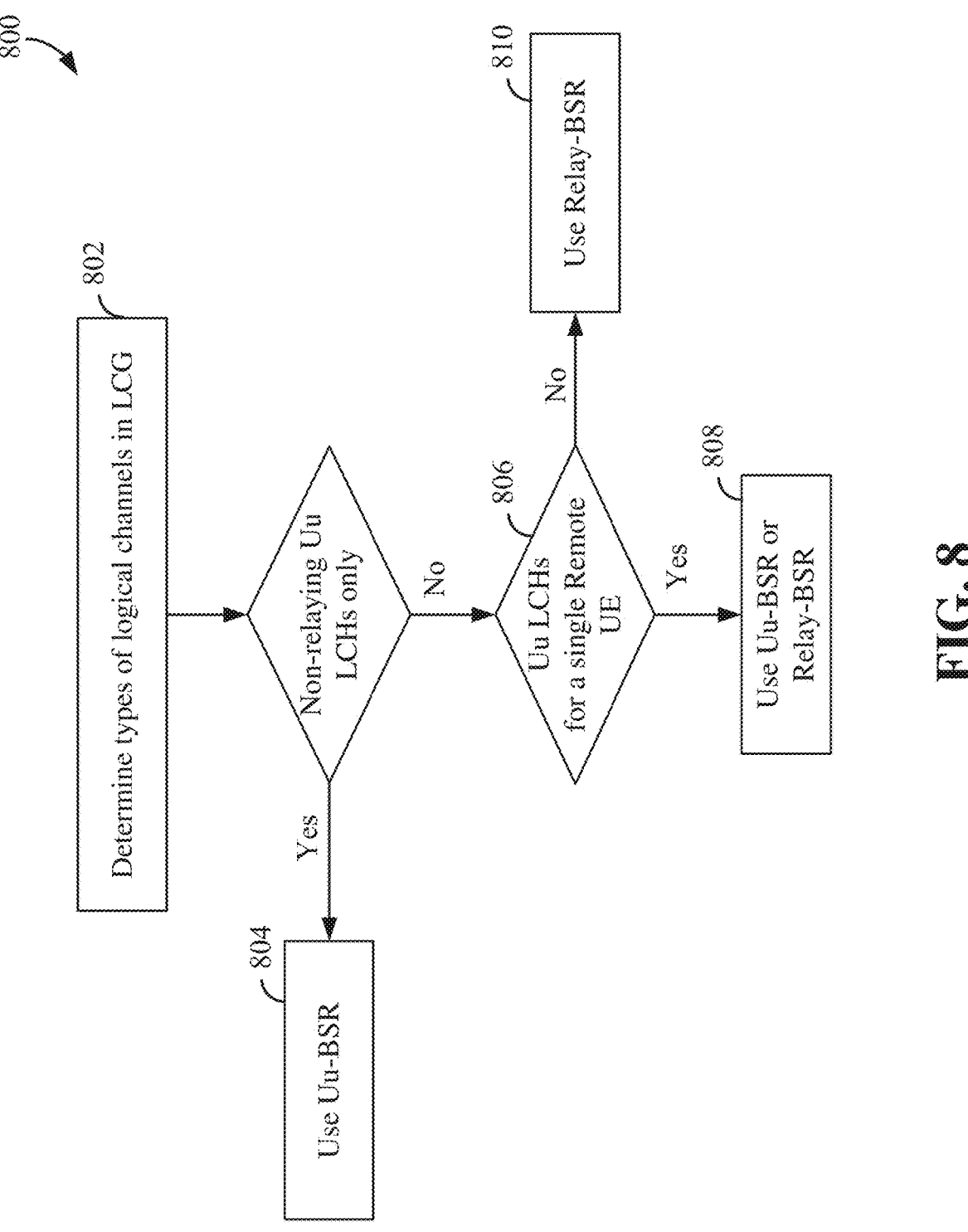
FIG. 8 is a flow chart illustrating a buffer status report (BSR) type selection procedure according to some aspects of the disclosure.

FIG. 8 is a flow chart illustrating a BSR type selection procedure 800 according to some aspects of the disclosure. The procedure 800 may be performed by any of the UEs in FIGS. 1, 3, and 5. For example, the relay UE 502. For ease of reference, FIG. 8 is discussed below with reference to the example shown in FIG. 5. For example, the relay UE 502 can use the procedure 800 to select a BSR type to request UL resources for an LCG. The relay UE 502 may have established one or more Uu logical channels with the base station 504. Each Uu logical channel may carry the traffic belonging to the relay UE and/or one or more remote UEs.

At block 802, the relay UE 502 can determine the type of Uu logical channels in a certain LCG that has UL data pending for transmission. If the LCG has only non-relaying Uu logical channels (i.e., an LCG including only logical channels between the relay UE and the network entity), the procedure can proceed to block 804; otherwise, the procedure can proceed to decision block 806. At block 804, the relay UE can use the normal BSR (e.g., a first BSR, Uu-BSR), for example, for requesting resources for the LCG (e.g., LCG1 in FIG. 5) with only non-relaying Uu logical channels.

From the decision block 806, if the LCG has one or more relaying Uu logical channels for a single remote UE, the procedure can proceed to block 808; otherwise, the procedure can proceed to block 810. At block 808, the relay UE can send a Uu-BSR or a Relay-BSR (e.g., a second BSR) if all relaying Uu logical channels are for a single remote UE with one or more E2E bearers (e.g., E2E bearers 513). For example, the Relay-BSR can indicate a remote UE ID (RemoteUEID) and/or a remote UE bearer ID (RemoteUE-BearerID) explicitly. The remote UE ID can indicate the specific remote UE that has UL data for transmission via the relay UE. The remote UE bearer ID can indicate the specific remote UE bearer that has data for transmission via the relay UE. At block 810, the relay UE can send a Relay-BSR (second BSR) for an LCG with relaying Uu logical channels for different remote UEs and/or E2E bearers. For example, the Relay-BSR can indicate the RemoteUEID and/or RemoteUEBearerID of the remote UEs or E2E bearers, respectively.

Relay-BSR Triggering

Figure 9:
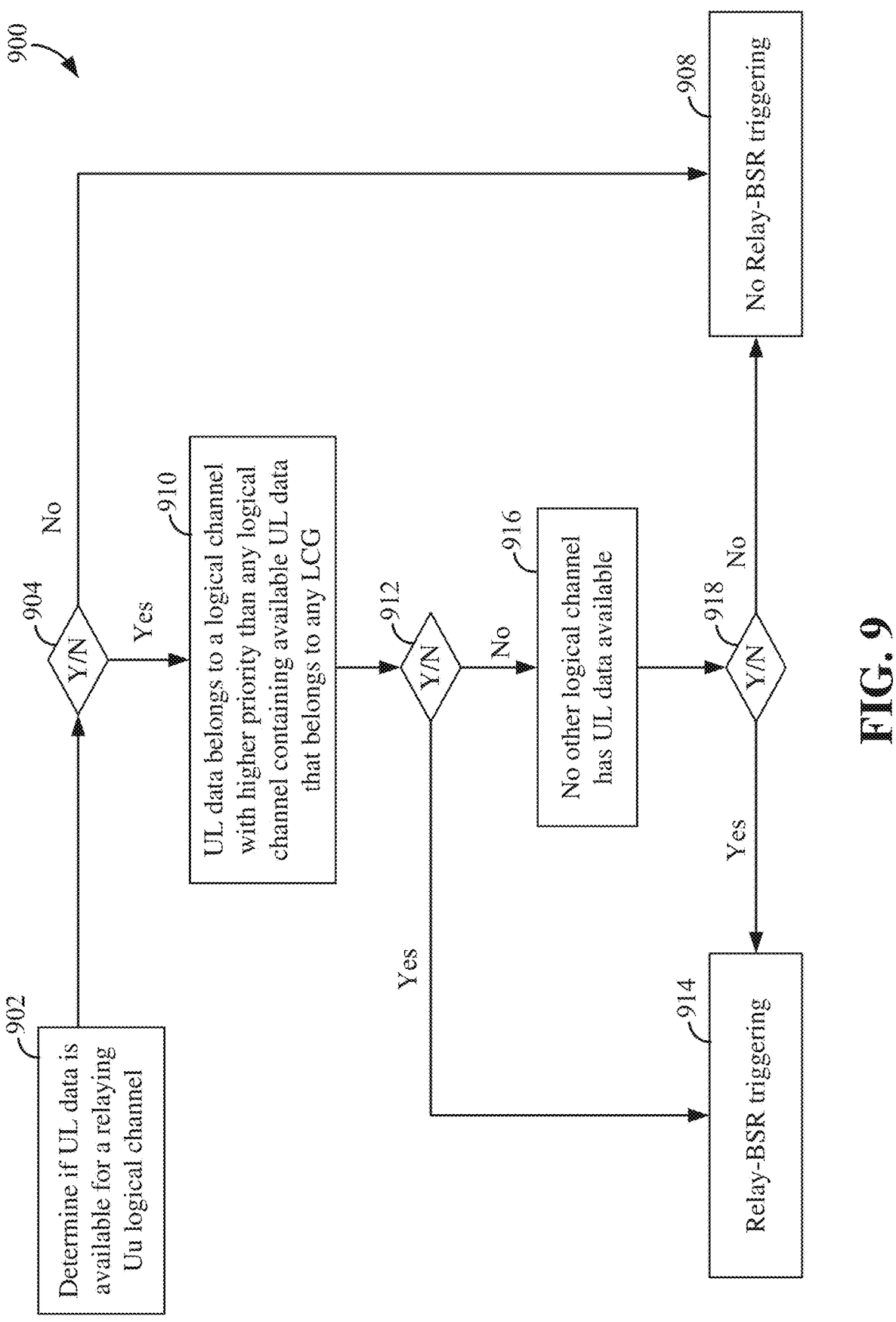
FIG. 9 is a flow chart illustrating a Relay-BSR triggering procedure according to some aspects of the disclosure.

FIG. 9 is a flow chart illustrating a BSR triggering procedure 900 according to some aspects of the disclosure. The procedure 900 may be performed by any of the UEs or scheduled entities in FIGS. 1, 3, and 5. For ease of reference, FIG. 9 is discussed below with reference to the example shown in FIG. 5. A relay UE can use the procedure 900 to determine when to transmit a BSR to a scheduling entity or base station.

At block 902, a relay UE (e.g., relay UE 502) can determine whether UL data for a relaying Uu logical channel in an LCG becomes available to the MAC entity of the UE. For example, the relaying Uu logical channel can relay direct link logical channels from one or more remote UEs. If no UL data (i.e., UL data from one or more remote UEs) is available or pending (NO path from decision 904), at block 908, the relay UE does not trigger a Relay-BSR (i.e., no Relay-BSR transmission). If UL data is available or pending (YES path from decision 904), at block 910, the relay UE can determine whether the UL data belongs to a logical channel with higher priority than any logical channel containing available UL data that belongs to any LCG.

If the UL data belongs to a logical channel with higher priority than any logical channel containing available UL data that belongs to any LCG, (YES path from decision block 912), at block 914, the relay UE can trigger a Relay-BSR (i.e., Relay-BSR transmission). Using Relay-BSR allows the scheduling to take into consideration the relative priority of the remote UE E2E bearers. Otherwise (NO path from decision block 912), at block 916, the relay UE can determine whether or not none of the logical channels that belongs to the LCG contains any available UL data. If none of the logical channels that belongs to the LCG contains any available UL data (YES path from decision 918), at block 908, the relay UE can trigger a Relay-BSR at block 814. Otherwise (NO path from decision 818), the relay UE does not trigger a Relay-BSR.

Relay-BSR Formats

In some aspects, the relay UE can use various short and long Relay-BSR formats for requesting resources from the network. FIGS. 10-13 illustrate various exemplary short Relay-BSR formats according to some aspects of the disclosure. The fields of the short Relay-BSR formats can include LCG ID field Total Buffer Size, one or more RemoteUEID fields, one or more RemoteUEBearerID fields (e.g., fields 1008, 1108, 1208, 1306), and one or more relaying data Buffer Size fields (Buffer Size$_i$) (e.g., fields 1010). The LCG ID field (e.g., fields 1002, 1102, 1202, 1302) indicates the logical channel group (LCG) for which data is available. The Total Buffer Size field (e.g., fields 1004, 1104, 1204, 1304) indicates the total amount of data available for the associated LCG. In one aspect, the total amount of data can be calculated across all Uu logical channels, including relaying logical channels, of an LCG group after the MAC PDU has been built. In one example, the calculation procedure specified in Release 16 of the 3GPP TS 38.322 and 38.323 can be used to calculate the total amount of data available. The RemoteUEID field (e.g., fields 1006, 1106, 1206) indicates the remote UE ID whose relaying data is included in the relaying data buffer size field (Buffer Size$_i$). The RemoteUEBearerID field (e.g., fields 1008, 1108, 1208, 1306) indicates the end-to-end bearer ID of a remote UE bearer whose relaying data buffer size is being reported in the associated relaying data buffer size field. The relaying data buffer size field (e.g., Buffer Size$_i$ 1010) can identify the amount of data available according to the relaying data volume calculated either per RemoteUEID or per RemoteUEID/RemoteUEBearerID combination.

In some aspects, the Uu Adaptation layer (e.g., Uu Adaptation layer 430) on the Relay UE can provide or indicate the remote UE IDs corresponding to the data to the MAC Layer (via the RLC Layer). In some aspects, the relay UE can determine the value of the Buffer Size, based on the radio link control (RLC) data volume per RemoteUEID$_i$ or per RemoteUEID$_i$/RemoteUEBearerID, combination. In one example, the relay UE can consider the RLC SDUs and RLC SDU segments belonging to a remote UE that have not yet been included in an RLC data PDU. In one example, the relay UE can consider the RLC data PDUs belonging to a remote UE that are pending for initial transmission. In one example, the remote UE can consider the RLC data PDUs belonging to a remote UE that are pending for retransmission (e.g., RLC Acknowledged Mode).

FIG. 10 is a schematic illustration of a first exemplary short Relay-BSR format 1000 according to some aspects of the disclosure. In one aspect, the relay UE can use the first short Relay-BSR format 1000 for reporting in decreasing priority order the RemoteUEID$_i$/RemoteUEBearerID, and the associated relaying data buffer size (Buffer Size$_i$) breakdown for each remoteUE bearer when multiple remote UE logical channels are relayed in an LCG (e.g., LCG3 in FIG. 5 relaying traffic for remote UE1 and remote UE2).

Figure 11:
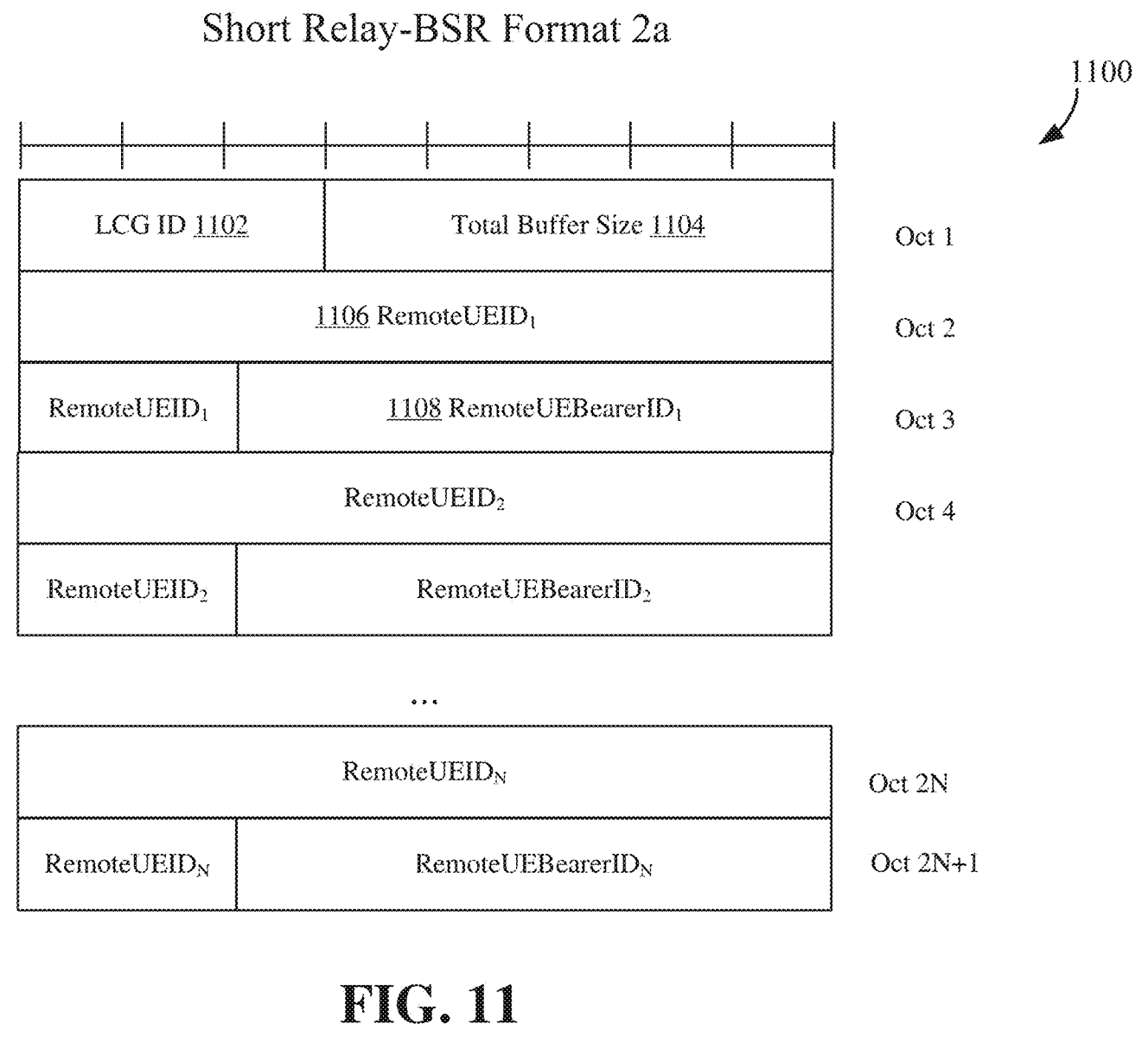

FIG. 11 is a schematic illustration of a second exemplary short Relay-BSR format 1100 according to some aspects of the disclosure. In one aspect, the relay UE can use the second short Relay-BSR format 1100 for reporting in decreasing priority order the RemoteUEID$_i$/RemoteUE-BearerID, for an LCG (e.g., LCG2 in FIG. 5) that consists of both relay UE logical channels (e.g., Uu RLC channels) and remote UE logical channels (e.g., PC5 RLC channels).

Figure 12:
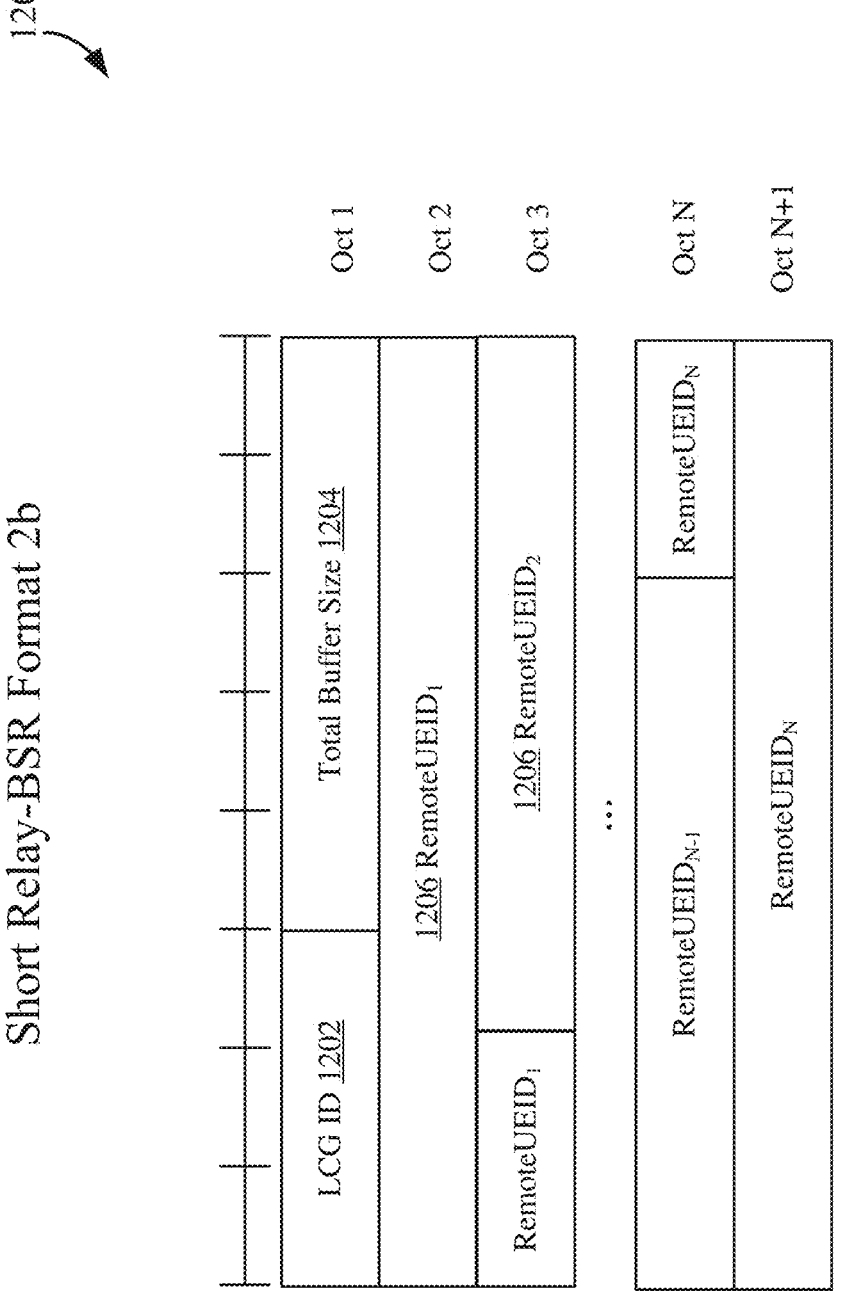

FIG. 12 is a schematic illustration of a third exemplary short Relay-BSR format 1200 according to some aspects of the disclosure. In one aspect, the relay UE can use the third short Relay-BSR format 1200 for reporting in decreasing priority order only the RemoteUEID$_i$ for an LCG (e.g., LCG2 and LCG 3 in FIG. 5) that consists of both relay UE logical channels (e.g., Uu RLC channels) and remote UE logical channels (e.g., PC5 RLC channels).

Figure 13:
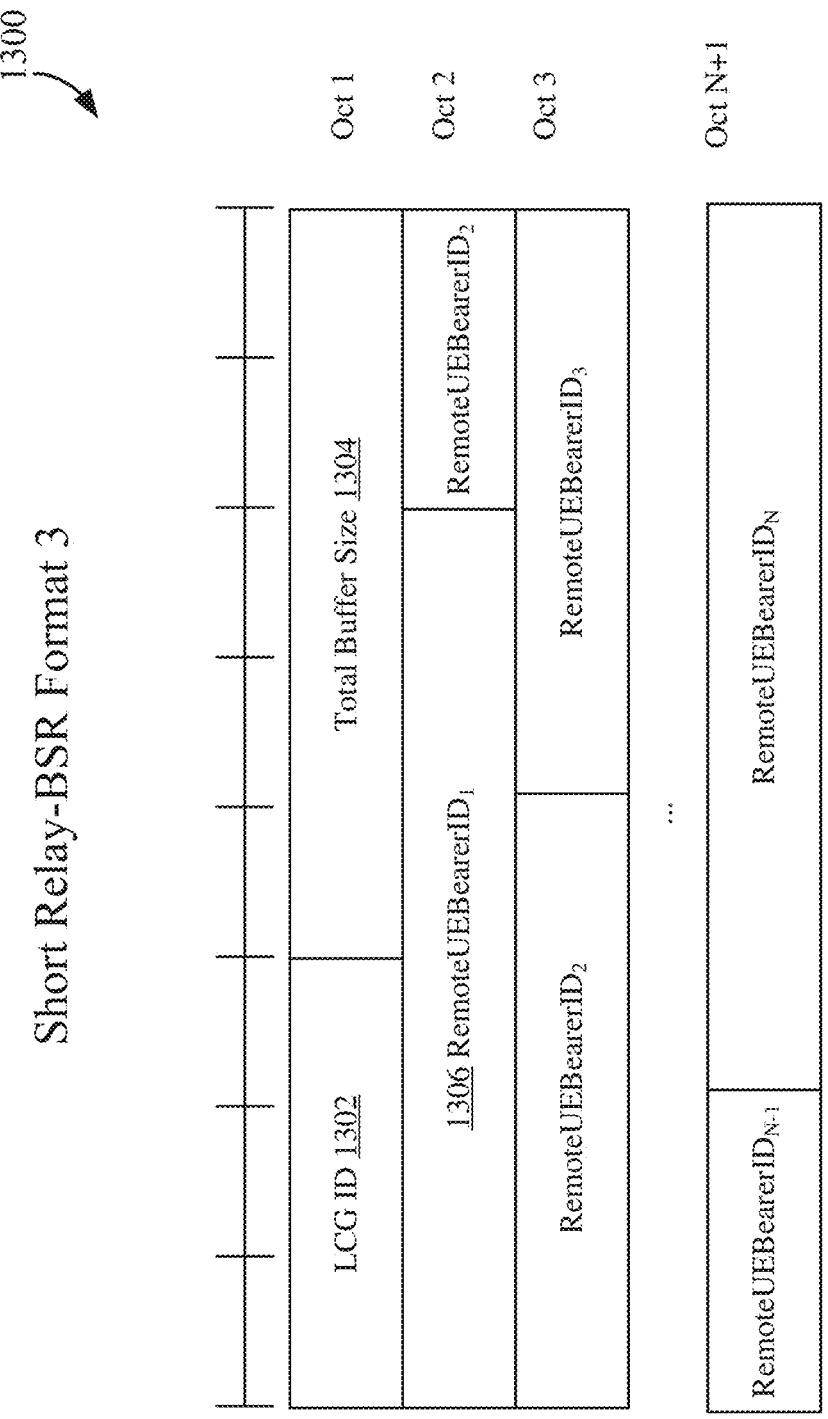

FIG. 13 is a schematic illustration of a fourth exemplary short Relay-BSR format 1300 according to some aspects of the disclosure. In one aspect, the relay UE can use the fourth short Relay-BSR format 1300 for reporting in decreasing priority order only the RemoteUEBearerID$_i$ for an LCG (e.g., LCG4 in FIG. 5) that consists of the logical channels of a single remote UE. Including only the RemoteUEBeare-rID$_i$ in the relay BSR is sufficient for the base station to determine the corresponding remote UE because the base station can identify the remote UE based on the LCG configuration, which is known to the base station. In some aspects, providing the RemoteUEID and/or RemoteUEBear-erID information in the Relay-BSR can assist the base station in scheduling UL grants based on the subscriptions of the remote UEs. For example, different subscriptions may correspond to different priorities in scheduling traffic.

FIG. 14 illustrate an exemplary long Relay-BSR format 1400 according to some aspects of the disclosure. A long Relay-BSR can provide information regarding multiple (i.e., one or more) LCGs. The relay UE can use this format to request resources if more than a single LCG has available uplink data. A long Relay-BSR can include various fields for each LCG including a number of LCG fields (LCG$_i$) 1402, one or more Buffer Size fields 1404, and one or more RemoteUEIdentifierlist fields 1406. Each LCG, 1402 indicates the presence of the corresponding Buffer Size i associated with the LCG, in the long Relay-BSR. For example, when a first LCG$_i$ (e.g., LCG$_1$) is activated (e.g., set to 1), it indicates that the corresponding Buffer Size i (e.g., Buffer Size 1) for the LCG, is reported or included in the long Relay-BSR. When a LCG, field is deactivated (e.g., set to 0), it indicates that the corresponding Buffer Size i associated with the LCG, is not reported or included in the long Relay-BSR.

In some aspects, buffer size (e.g., Buffer Size i) of a LCG can be determined based on the total amount of data available across all logical channels associated with the LCG, including the relaying and non-relaying logical channels of the LCG after the MAC PDU has been built. In one example, the amount of data can be determined according to the data volume calculation procedure specified in Release 16 of the 3GPP TS 38.322 and 38.323. The long Relay-BSR 1400 can further include a RemoteUEIdentifierlist field 1406 (e.g., RemoteUEIdentifierlist 1 to RemoteUEIdentifierlist n in FIG. 14) for each activated LCG. Each RemoteUEIdentifierlist field can indicate the prioritized list of RemoteUEID$_i$, RemoteUEBearerID$_i$, and/or relaying data Buffer Size, that can fit within the N Octets for each LCG. In some aspects, the RemoteUEIdentifierlist field can have the same format of the RemoteUEID, RemoteUEBearerID, and/or relaying data Buffer Size fields of the short Relay-BSR formats as described above relation to FIGS. 10-13.

In some aspects, the relay UE can determine the value of the Buffer Size, based on the radio link control (RLC) data volume per RemoteUEID, or per RemoteUEID$_i$/RemoteUE-BearerID, combination. In one example, the relay UE can consider the RLC SDUs and RLC SDU segments belonging to a remote UE that have not yet been included in an RLC data packet data unit (PDU). In one example, the relay UE can consider the RLC data PDUs belonging to a remote UE that are pending for initial transmission. In one example, the remote UE can consider the RLC data PDUs belonging to a remote UE that are pending for retransmission (e.g., RLC Acknowledged Mode).

In some aspects, the Relay-BSR may be prioritized with respect to other MAC-CEs to be transmitted to the base station. In one example, a MAC CE for a sidelink BSR can have a higher priority than the MAC-CE for a normal BSR (e.g., Uu-BSR), and a MAC CE for the Relay-BSR can be prioritized under the normal BSR. In one example, the Relay-BSR MAC CE may be prioritized such that the Relay-BSR MAC CE has a priority adjacent to (e.g., immediately below) the normal BSR priority. In some examples, the normal BSR MAC CE may have a higher priority than the Relay-BSR.

Resource Allocation Based on Relay-BSR

Figure 15:
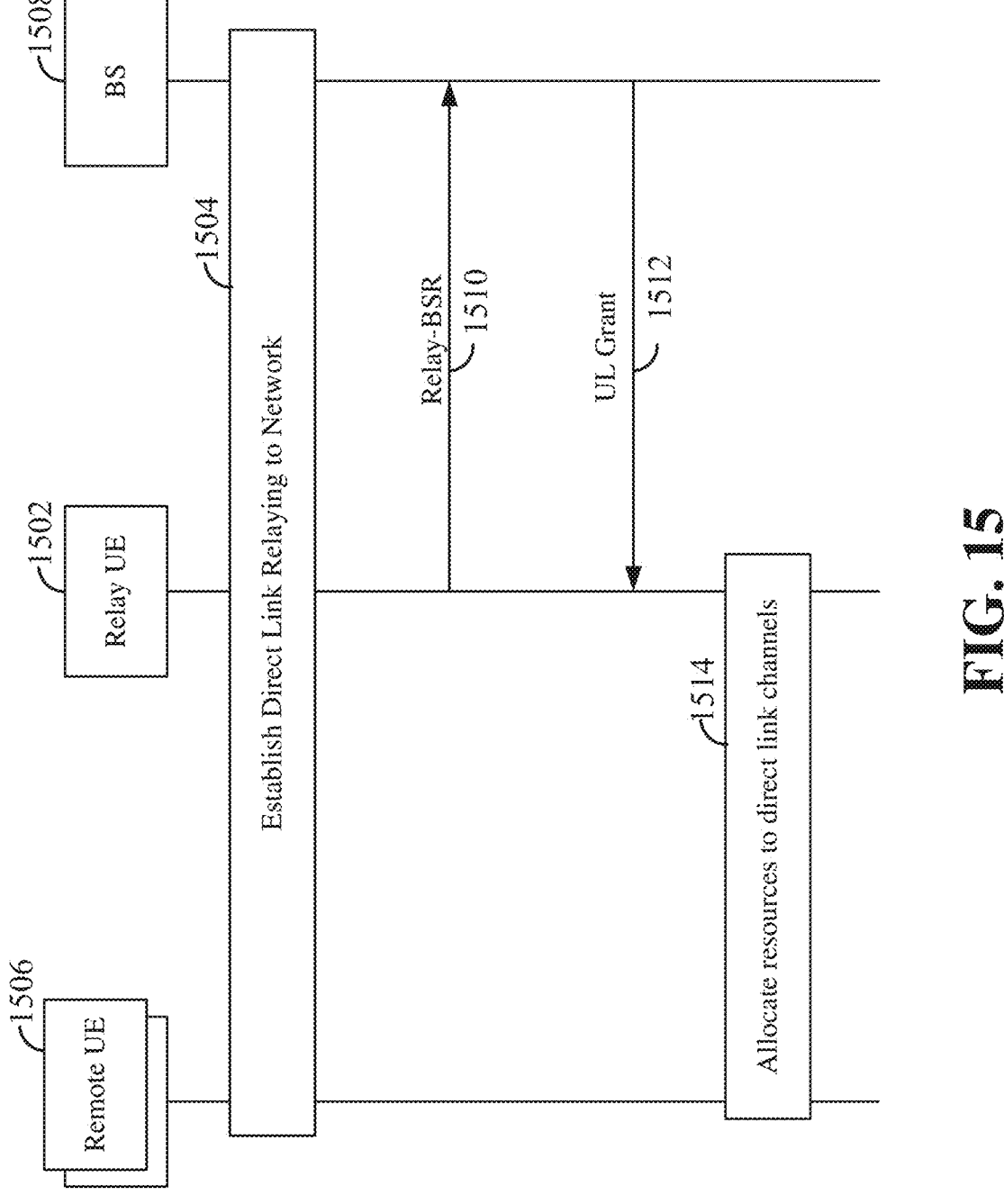
FIG. 15 is a diagram illustrating a resource allocation procedure using Relay-BSR according to some aspects of the disclosure.

FIG. 15 is a diagram illustrating a resource allocation procedure using a Relay-BSR according to some aspects of the disclosure. In some aspects, a base station can consider the remote UE information in a Relay-BSR to provide fair scheduling for the remote UE E2E bearer traffic. In one example, a relay UE 1502 can establish a relaying logical channel 1504 to relay direct link traffic (e.g., sidelink traffic via a PC5 interface) between one or more remote UEs 1506 and the base station 1508 (e.g., gNB). The relay UE 1502 and the remote UEs 1506 can be any of the UEs or scheduled entities described above in relation to FIGS. 1, 3, and 5. The base station 1508 can be any of the base stations or scheduling entities described above in relation to FIGS. 1, 3, and 5. In some cases, the remote UEs 1506 can be out-of-coverage of the base station 1508 while the relay UE 1502 can be in a coverage area of the base station 1508.

When UL data (e.g., relaying data from any remote UE 1506) is available for transmission to the base station 1508, the relay UE 1502 can transmit a Relay-BSR 1510 to the base station 1508 to request UL resources. The relay UE 1502 can use any of the short or long Relay-BSR formats according to the types of UL data available as described above in relation to FIGS. 10-14. For example, the Relay-BSR 1510 can include the RemoteUEID field and/or RemoteUEBearerID field as described above to indicate the corresponding remote UEs and/or E2E bearers. In response to the Relay-BSR, the base station 1508 can transmit an UL grant 1512 to the relay UE 1502 in, for example, a DCI/PDCCH. In some aspects, the DCI can include the RemoteUEID and/or RemoteUEBearerID information received from the Relay-BSR 1510. Including the RemoteUEID and/or RemoteUEBearerID information in the DCI allows for the scheduling of both an UL grant of Uu resources for the transmission of the data from the remote UE 1506 on the Uu link, and sidelink resources (e.g., mode 1 resources) to the remote UE for the transmission of the data from the remote UE 1506 to the relay UE. For example, when the UL grant 1512 received from the base station 1508 includes information (e.g., RemoteUEID and/or RemoteUE-BearerID) for identifying certain remote UE(s) and/or E2E bearer(s), the relay UE 1502 can allocate resources 1514 to the corresponding relaying logical channels (e.g., PC5 RLC channel data in Uu MAC). If any resources remain, the relay UE 1502 can use the LCP procedure described above in relation to FIGS. 5-7 to allocate resources among the remote UEs 1506.

Figure 16:
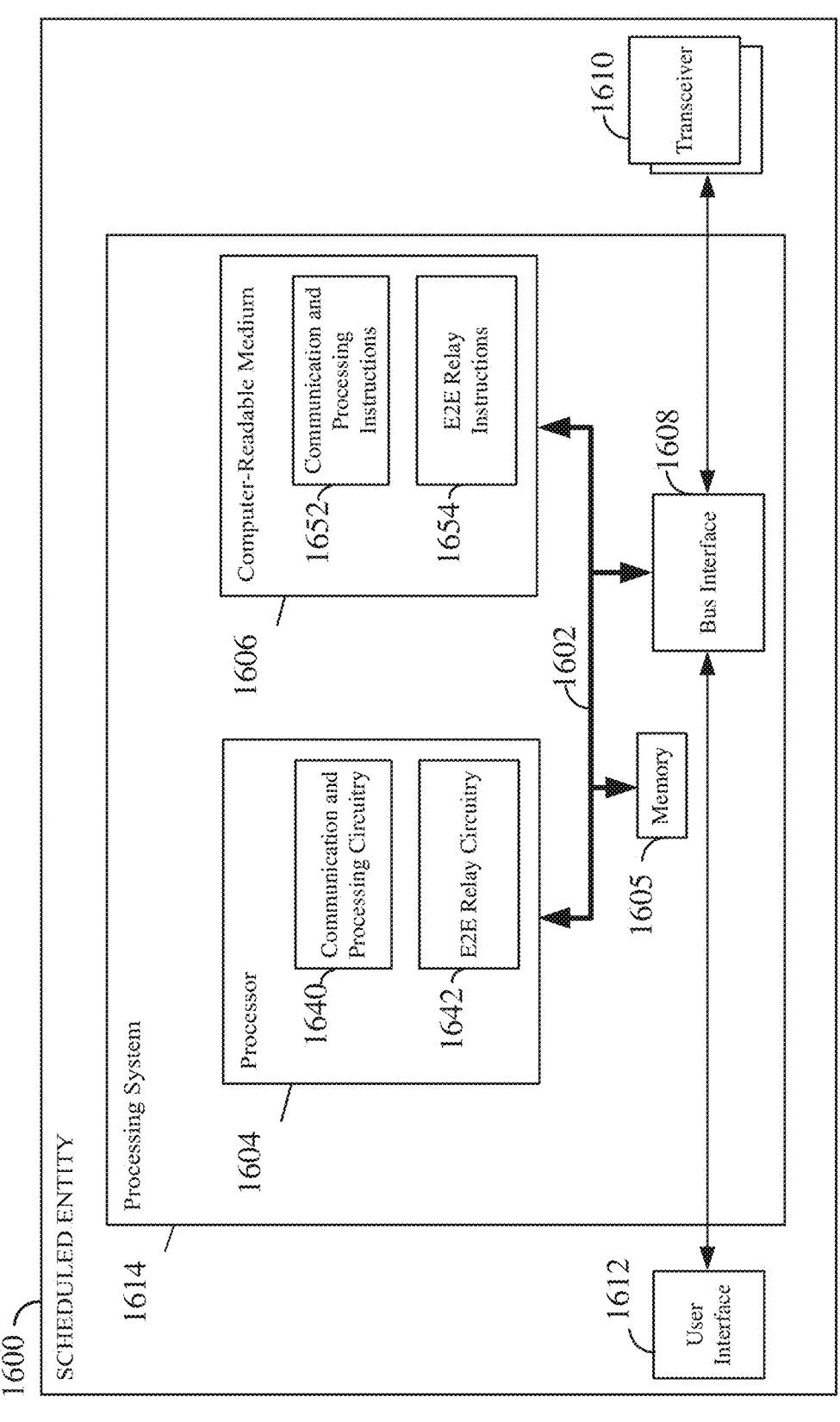
FIG. 16 is a block diagram illustrating an example of a hardware implementation for a scheduled entity according to some aspects of the disclosure.

FIG. 16 is a block diagram illustrating an example of a hardware implementation for a scheduled entity 1600 employing a processing system 1614. For example, the scheduled entity 1600 may be a wireless communication device or user equipment (UE) as illustrated in any one or more of FIGS. 1, 3, 5, and/or 15.

The scheduled entity 1600 may be implemented with a processing system 1614 that includes one or more processors 1604. Examples of processors 1604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduled entity 1600 may be configured to perform any one or more of the functions described herein. That is, the processor 1604, as utilized in a scheduled entity 1600, may be used to implement any one or more of the processes and procedures described and illustrated in FIGS. 6-9, 15, 17, and 18.

The processor 1604 may in some instances be implemented via a baseband or modem chip and in other implementations, the processor 1604 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1614 may be implemented with a bus architecture, represented generally by the bus 1602. The bus 1602 may include any number of interconnecting buses and bridges depending on the specific application of the processing system 1614 and the overall design constraints. The bus 1602 communicatively couples together various circuits including one or more processors (represented generally by the processor 1604), a memory 1605, and computer-readable media (represented generally by the computer-readable medium 1606). The bus 1602 may also link various other circuits such as timing sources, peripherals, voltage regulators, and power management circuits, which are well known in the art, and therefore, will not be described any further. A bus interface 1608 provides an interface between the bus 1602 and one or more transceivers 1610. The transceivers 1610 provide a communication interface or means for communicating with various other apparatus over a transmission medium. In some examples, the transceivers 1610 can be configured to communicate with a network entity (e.g., base station, gNB, scheduling entity) using an NR air interface, and one or more remote UEs using a direct link. Examples of direct link include D2D link, sidelink, Bluetooth, Wi-Fi, PC5, etc. Depending upon the nature of the apparatus, a user interface 1612 (e.g., keypad, display, speaker, microphone, joystick) may also be provided. Of course, such a user interface 1612 is optional, and may be omitted in some examples, such as a base station.

In some aspects of the disclosure, the processor 1604 may include circuitry configured for various functions, including, for example, relaying end-to-end (E2E) bearer with QoS support using one or more LCGs and logical channel prioritization processes. For example, the circuitry may be configured to implement one or more of the functions described below in relation to FIGS. 17 and 18.

In some aspects of the disclosure, the processor 1604 may include communication and processing circuitry 1640 configured for various functions, including for example communicating with a network entity (e.g., a scheduling entity, gNB, or base station), or any other entity, such as, for example, one or more sidelink (direct link) devices. In some examples, the communication and processing circuitry 1640 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1640 may include one or more transmit/receive chains. In addition, the communication and processing circuitry 1640 may be configured to process and transmit uplink traffic and uplink control messages (e.g., PUSCH and PUCCH), receive and process downlink traffic and downlink control messages (e.g., PDSCH and PDCCH), transmit/receive and process sidelink traffic and sidelink control messages. The communication and processing circuitry 1640 may further be configured to execute communication and processing software 1652 stored on the computer-readable medium 1606 to implement one or more functions described herein.

In some implementations where the communication involves receiving information, the communication and processing circuitry 1640 may obtain information from a component of the scheduled entity 1600 (e.g., from the transceiver 1610 that receives the information via radio frequency signaling or some other type of signaling suitable for the applicable communication medium), process (e.g., decode) the information, and output the processed information. For example, the communication and processing circuitry 1640 may output the information to another component of the processor 1604, to the memory 1605, or to the bus interface 1608. In some examples, the communication and processing circuitry 1640 may receive one or more of signals, messages, other information, or any combination thereof. In some examples, the communication and processing circuitry 1640 may receive information via one or more channels. In some examples, the communication and processing circuitry 1640 may include functionality for a means for receiving. In some examples, the communication and processing circuitry 1640 may include functionality for a means for processing, including a means for demodulating, a means for decoding, etc.

In some implementations where the communication involves sending (e.g., transmitting) information, the communication and processing circuitry 1640 may obtain information (e.g., from another component of the processor 1604, the memory 1605, or the bus interface 1608), process (e.g., modulate, encode, etc.) the information, and output the processed information. For example, the communication and processing circuitry 1640 may output the information to the transceiver 1610 (e.g., that transmits the information via radio frequency signaling or some other type of signaling suitable for the applicable communication medium). In some examples, the communication and processing circuitry 1640 may send one or more of signals, messages, other information, or any combination thereof. In some examples, the communication and processing circuitry 1640 may send information via one or more channels. In some examples, the communication and processing circuitry 1640 may include functionality for a means for sending (e.g., a means for transmitting). In some examples, the communication and processing circuitry 1640 may include functionality for a means for generating, including a means for modulating, a means for encoding, etc.

In some aspects of the disclosure, the processor 1604 may include end-to-end (E2E) relay circuitry 1642 configured for various functions, including for example a logical channel prioritization (LCP) procedure to allocate resources at a relay UE in consideration of E2E bearer QoS for remote UE traffic. The E2E relay circuitry 1642 can further be configured to transmit different buffer status reports (e.g., Uu-BSR and Relay-BSR) using various formats (e.g., short and long Relay-BSRs in FIGS. 9-13) to assist a network entity (e.g., gNB, base station, or scheduling entity) in allocating resources for relaying E2E bearers. The E2E relay circuitry 1642 may further be configured to execute E2E relay software 1654 stored on the computer-readable medium 1606 to implement one or more functions described herein.

The processor 1604 is responsible for managing the bus 1602 and general processing, including the execution of software stored on the computer-readable medium 1606. The software, when executed by the processor 1604, causes the processing system 1614 to perform the various functions described below for any particular apparatus. The computer-readable medium 1606 and the memory 1605 may also be used for storing data that is manipulated by the processor 1604 when executing software.

One or more processors 1604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1606. The computer-readable medium 1606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EE-PROM), a register, a removable disk, and any other suitable medium for storing software and/or instructions that may be accessed and read by a computer. The computer-readable medium 1606 may reside in the processing system 1614, external to the processing system 1614, or distributed across multiple entities including the processing system 1614. The computer-readable medium 1606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

FIG. 17 is a flow chart illustrating an exemplary resource allocation procedure 1700 of LCG resources for relaying remote UE traffic in consideration of E2E bearer QoS requirement according to some aspects of the present disclosure. As described below, some or all illustrated features may be omitted in a particular implementation within the scope of the present disclosure, and some illustrated features may not be required for the implementation of all implementations. In some examples, the procedure 1700 may be carried out by the scheduled entity 1600 illustrated in FIG. 16. In some examples, the procedure 1700 may be carried out by any suitable apparatus or means for carrying out the functions or algorithm described below.

At block 1702, a UE (e.g., a relay UE or scheduled entity) can establish direct link communication (e.g., PC5 RLC channels) between the UE and at least one remote device (e.g., remote UEs 506 and 508) for relaying one or more remote device end-to-end (E2E) bearers between the at least one remote device and a network entity. In one aspect, the communication and processing circuitry 1640 can provide a means to establish the direct link communication between the UE and the at least one remote device (e.g., remote UEs). In one example, the direct link communication may use a PC5 interface or sidelink RLC channels similar to those described above in relation to FIG. 5. In other examples, the direct link communication may use other wireless communication techniques (e.g., Bluetooth, Wi-Fi, and D2D).

At block 1704, the UE can multiplex the at least one remote device E2E bearer to at least one device-to-network (D2N) logical channel between the UE and a network entity (e.g., gNB 504 or base station). In one aspect, the E2E relay circuitry 1642 can provide a means to multiplex the at least one remote device E2E bearer to the at least one D2N logical channel between the UE and the network entity. In one example, the D2N logical channel can be a Uu RLC channel (e.g., Uu RLCs 510, 515, and 517) similar to those described above in relation to FIG. 5. In one example, the at least one remote device E2E bearer can include one or more SRBs and/or DRBs established between the at least one remote device and the network entity.

At block 1706, the UE can receive resource allocation information from the network entity. In one aspect, the communication and processing circuitry 1640 can provide a means to receive the resource allocation information, for example, a resource grant in a DCI from the network entity. In one example, the DCI can include UL grants for one or more logical channel groups (LCGs). Each LCG may include a subset of the at least one D2N logical channel. In some aspects, one or more Uu logical channels of the LCGs can relay the remote device E2E bearers (e.g., E2E bearer 513) between the at least one remote device and the network entity.

At block 1708, the UE can allocate, based on the resource allocation information, communication resources (e.g., RBs 208) to the at least one remote device E2E bearer in consideration of at least in part a quality of service (QoS) requirement of the at least one remote device E2E bearer. In one aspect, the E2E relay circuitry 1642 can provide a means to allocate the communication resources, for example, using the logical channel prioritization procedure (LCP) described above in relation to FIGS. 6 and 7. In one example, the UE can allocate the communication resources (e.g., one or more RBs 208) to the D2D logical channels in consideration of a relative priority of the D2D logical channels.

FIG. 18 is a flow chart illustrating an exemplary buffer status reporting procedure 1800 in consideration of E2E bearer QoS requirement according to some aspects of the disclosure. As described below, some or all illustrated features may be omitted in a particular implementation within the scope of the present disclosure, and some illustrated features may not be required for the implementation of all implementations. In some examples, the procedure 1800 may be carried out by the scheduled entity 1600 illustrated in FIG. 16. In some examples, the procedure 1800 may be carried out by any suitable apparatus or means for carrying out the functions or algorithm described below.

At block 1802, a UE (e.g., a relay UE 502 or scheduled entity) can establish at least one direct link connection (e.g., PC5 RLC channels) between the UE and at least one remote device (e.g., remote UEs 506 and 508) for relaying at least one remote device E2E bearer between the at least one remote device and a network entity (e.g., a base station or gNB 504). In one aspect, the communication and processing circuitry 1640 can provide a means to establish the at least one direct link connection between the UE and the at least one remote devices (e.g., remote UEs 506 and 508).

At block 1804, the UE can transmit a first buffer status report (BSR) to the network entity for requesting communication resources from the network entity. The first BSR (e.g., Relay-BSR) can include information for at least one of identifying the at least one remote device or the at least one remote device E2E bearer. In one aspect, the communication and processing circuitry 1640 can provide a means to transmit the first BSR. In one example, the first BSR may be any of the short and long relay BSRs described above in relation to FIGS. 10-14.

At block 1806, the UE can receive, from the network entity, resource allocation information including remote device information for at least one of identifying the at least one remote device or the at least one remote device E2E bearer. In one aspect, the communication and processing circuitry 1640 can provide a means to receive the resource allocation information. In one example, the resource allocation information may be a DCI providing an UL grant (e.g., UL grant 1512). In one example, the resource allocation information can indicate the RemoteUEID and/or RemoteUEBearerID information corresponding to the at least one remote device or the at least one remote device E2E bearer.

At block 1808, the UE can allocate communication resources to the at least one remote device or the at least one remote device E2E bearer identified by the remote device information. In one aspect, the E2E relay circuitry 1642 can provide a means to allocate the communication resources. In one example, the UE can allocate the communication resources to the at least one remote device or the at least one remote device E2E bearer based on the RemoteUEID and/or RemoteUEBearerID information. The RemoteUEID and RemoteUEBearerID enable the UE to allocate the granted Uu resources to the at least one remote device corresponding to the RemoteUEID and/or the at least one remote device E2E bearer corresponding to the RemoteUEBearerID.

Figure 19:
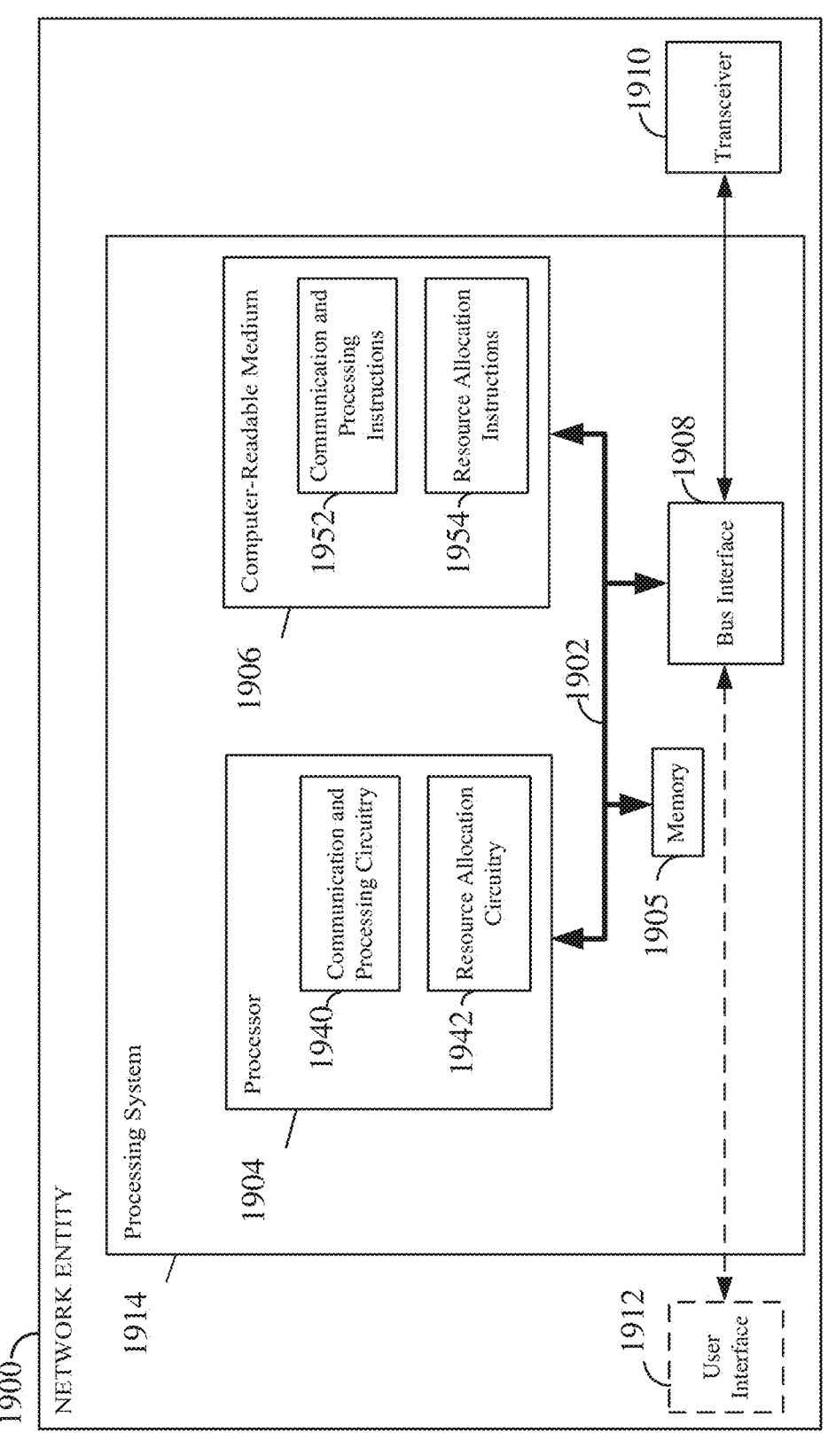
FIG. 19 is a block diagram illustrating an example of a hardware implementation for a network entity according to some aspects of the disclosure.

FIG. 19 is a diagram illustrating an example of a hardware implementation for an exemplary network entity 1900 employing a processing system 1914. In accordance with various aspects of the disclosure, an element, or any portion of an element, or any combination of elements may be implemented with a processing system 1914 that includes one or more processors 1904. For example, the network entity 1900 may be a network entity or base station as illustrated in any one or more of FIGS. 1, 5, and/or 15.

The processing system 1914 may be substantially the same as the processing system 1614 illustrated in FIG. 16, including a bus interface 1908, a bus 1902, memory 1905, a processor 1904, and a computer-readable medium 1906. Furthermore, the network entity 1900 may include an optional user interface 1912 and a transceiver 1910 substantially similar to those described above in FIG. 16. That is, the processor 1904, as utilized in a network entity 1900, may be used to implement any one or more of the processes described and illustrated in FIGS. 5-8, 15, and 20.

In some aspects of the disclosure, the processor 1904 may include circuitry configured for various functions, including, for example, allocating resources to a UE for relaying end-to-end (E2E) bearers with QoS support. For example, the circuitry may be configured to implement one or more of the functions described in relation to FIG. 20.

In some aspects of the disclosure, the processor 1904 may include communication and processing circuitry 1940 configured for various functions, including for example communicating with one or more remote devices (e.g., remote UEs 506 and 508) directly (e.g., using D2D or sidelink communication) or indirectly via a relay UE (e.g., UE 502). In some examples, the communication and processing circuitry 1940 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1940 may include one or more transmit/receive chains. In addition, the communication and processing circuitry 1940 may be configured to receive and process uplink traffic and uplink control messages (e.g., PUSCH and PUCCH), process and transmit downlink traffic and downlink control messages (e.g., PDSCH and PDCCH). The communication and processing circuitry 1940 may further be configured to execute communication and processing software 1952 stored on the computer-readable medium 1906 to implement one or more functions described herein.

In some implementations where the communication involves receiving information, the communication and processing circuitry 1940 may obtain information from a component of the network entity 1900 (e.g., from the transceiver 1910 that receives the information via radio frequency signaling or some other type of signaling suitable for the applicable communication medium), process (e.g., decode) the information, and output the processed information. For example, the communication and processing circuitry 1940 may output the information to another component of the processor 1904, to the memory 1905, or to the bus interface 1908. In some examples, the communication and processing circuitry 1940 may receive one or more of signals, messages, other information, or any combination thereof. In some examples, the communication and processing circuitry 1940 may receive information via one or more channels. In some examples, the communication and processing circuitry 1940 may include functionality for a means for receiving. In some examples, the communication and processing circuitry 1940 may include functionality for a means for processing, including a means for demodulating, a means for decoding, etc.

In some implementations where the communication involves sending (e.g., transmitting) information, the communication and processing circuitry 1940 may obtain information (e.g., from another component of the processor 1904, the memory 1905, or the bus interface 1908), process (e.g., modulate, encode, etc.) the information, and output the processed information. For example, the communication and processing circuitry 1940 may output the information to the transceiver 1910 (e.g., that transmits the information via radio frequency signaling or some other type of signaling suitable for the applicable communication medium). In some examples, the communication and processing circuitry 1940 may send one or more of signals, messages, other information, or any combination thereof. In some examples, the communication and processing circuitry 1940 may send information via one or more channels. In some examples, the communication and processing circuitry 1940 may include functionality for a means for sending (e.g., a means for transmitting). In some examples, the communication and processing circuitry 1940 may include functionality for a means for generating, including a means for modulating, a means for encoding, etc.

In some aspects of the disclosure, the processor 1904 may include resource allocation circuitry 1942 configured for various functions, including for example allocating communication resources to a UE (e.g., relay UE 502) that relays one or more E2E bearers between the network entity 1900 and one or more remote UEs via the relay UE. The resource allocation circuitry 1942 can further be configured to receive a relay buffer status report (Relay-BSR) using various formats (e.g., short and long Relay-BSRs in FIGS. 10-14) that can assist the network entity 1900 in resource allocation for the E2E bearers relayed by a relay UE. The resource allocation circuitry 1942 may further be configured to execute resource allocation software 1954 stored on the computer-readable medium 1906 to implement one or more functions described herein.

FIG. 20 is a flow chart illustrating an exemplary resource allocation procedure 2000 using a Relay-BSR according to some aspects of the disclosure. As described below, some or all illustrated features may be omitted in a particular implementation within the scope of the present disclosure, and some illustrated features may not be required for all implementations. In some examples, the process 2000 may be carried out by the network entity 1900 illustrated in FIG. 19. In some examples, the process 2000 may be carried out by any suitable apparatus or means for carrying out the functions or algorithm described below.

At block 2002, the network entity (e.g., gNB 504) can establish at least one E2E bearer (e.g., E2E bearers 513) between the network entity and at least one remote device via a relay UE (e.g., relay UE 502). In one aspect, the communication and processing circuitry 1940 can provide a means to establish the at least one E2E bearer. In one example, the at least one E2E bearer may include SRBs and/or DRBs between the network entity and the at least one remote device. In one example, each E2E bearer (e.g., E2E bearer 513) can correspond to a direct link logical channel (e.g., PC5 RLC channel) between a remote UE and a relay UE, and a Uu logical channel (e.g., Uu RLC channel) between the relay UE and the network entity. In some aspects, the remote devices may be out-of-coverage of the network entity and rely on the relay UE to relay the E2E bearers with the network entity.

At block 2004, the network entity can receive a buffer status report (BSR) from the relay UE for requesting communication resources. The BSR can include information for at least one of identifying the at least one remote device and/or the at least one E2E bearers. In one aspect, the communication and processing circuitry 1940 can provide a means to receive the BSR in a MAC CE. In one example, the BSR may be any of the short and long Relay-BSRs described in relation to FIGS. 11-14.

At block 2006, the network entity can determine communication resources allocation information for the at least one E2E bearer based on the BSR. In one aspect, the resource allocation circuitry 1942 can provide a means to determine the communication resources allocation (e.g., RBs for Uu logical channels) for the at least one E2E bearer based on the BSR (e.g., Relay-BSR) received from the relay UE.

At block 2008, the network entity can transmit the resource allocation information to the relay UE. The resource allocation information can include remote device information for at least one of identifying the at least one remote device or the at least one E2E bearer. In one aspect, the communication and processing circuitry 1940 can provide a means to transmit the resource allocation information to the relay UE. In one aspect, the resource allocation information allocates communication resources to the at least one remote devices or the at least one E2E bearer in consideration of a QoS requirement of the at least one E2E bearer.

A first aspect of the disclosure provides a method of wireless communication at a user equipment (UE). The method includes: establishing direct link communication between the UE and one or more remote devices for relaying one or more remote device end-to-end (E2E) bearers between the one or more remote devices and a network entity; multiplexing the one or more remote device E2E bearers to one or more device-to-network (D2N) logical channels between the UE and the network entity; receiving resource allocation information from the network entity; and allocating, based on the resource allocation information, communication resources to the one or more remote devices E2E bearers in consideration of at least in part a quality of service (QoS) requirement of the one or more remote device E2E bearers.

A second aspect of the disclosure, alone or in combination of the first aspect, wherein the direct link communication includes at least one of: sidelink communication using a PC5 interface; sidelink communication without a PC5 interface; Bluetooth communication; Wi-Fi communication; or device-to-device (D2D) communication.

A third aspect of the disclosure, alone or in combination of any of the first to second aspects, wherein the establishing the direct link communication includes establishing a plurality of PC5 logical channels corresponding to the one or more remote device E2E bearers between the UE and the one or more remote devices for sidelink communication.

A fourth aspect of the disclosure, alone or in combination of any of the first to third aspects, wherein the multiplexing includes at least one of: multiplexing one of the one or more remote device E2E bearers to one of the one or more D2N logical channels; or multiplexing multiple of the one or more remote device E2E bearers to one of the one or more D2N logical channels.

A fifth aspect of the disclosure, alone or in combination of any of the first to third aspects, wherein the multiplexing includes: multiplexing the one or more remote device E2E bearers to a single logical channel group (LCG) including the one or more D2N logical channels; or multiplexing the one or more remote device E2E bearers to a plurality of LCGs, each LCG including a subset of the one or more D2N logical channels.

A sixth aspect of the disclosure, alone or in combination of any of the first to fifth aspects, wherein the resource allocation information includes: a grant of the communication resources for a logical channel group including the one or more D2N logical channels multiplexed with the one or more remote device E2E bearers.

A seventh aspect of the disclosure, alone or in combination of any of the first to sixth aspects, wherein the allocating includes: allocating the communication resources to the one or more remote device E2E bearers based on at least in part a priority order of the one or more remote device E2E bearers on the direct link communication.

An eighth aspect of the disclosure, alone or in combination of any of the first to seventh aspects, wherein the allocating includes: allocating the communication resources to the one or more remote device E2E bearers in a decreasing priority order.

A ninth aspect of the disclosure, alone or in combination of any of the first to eighth aspects, wherein the allocating further includes: maintaining a variable Bj for each of the one or more remote device E2E bearers; selecting one or more of the remote device E2E bearers, wherein the variable Bj of each selected remote device E2E bearer is greater than zero; and allocating the communication resources to the selected one or more remote device E2E bearers in a decreasing priority order.

A tenth aspect of the disclosure, alone or in combination of the ninth aspect, wherein the allocating further includes: if the communication resources remain available after allocating the communication resources to the selected one or more remote device E2E bearers, allocating the remaining communication resources to the one or more remote device E2E bearers in a decreasing priority order without regard to the variable Bj.

An eleventh aspect of the disclosure, alone or in combination of any of the first to tenth aspects, wherein the one or more remote devices are out-of-coverage of the network entity.

A twelfth aspect of the disclosure provides a method of wireless communication at a relay user equipment (UE). The method includes establishing one or more direct link connections between the relay UE and one or more remote devices for relaying one or more remote device end-to-end (E2E) bearers between the one or more remote devices and a network entity; and transmitting a first buffer status report (BSR) to the network entity for requesting communication resources from the network entity, the first BSR including information for at least one of identifying the one or more remote devices or the one or more remote device E2E bearers.

A thirteen aspect of the disclosure, alone or in combination of the twelfth aspect, wherein the one or more direct link connections include at least one of: a sidelink connection using a PC5 interface; a sidelink connection without a PC5 interface; a Bluetooth connection; a Wi-Fi connection; or a device-to-device (D2D) connection.

A fourteenth aspect of the disclosure, alone or in combination of any of the twelfth to thirteen aspects, the method further includes: determining to transmit the first BSR or a second BSR based on one or more device-to-network (D2N) logical channels included in a logical channel group (LCG), the determining including: transmitting the first BSR when the one or more D2N logical channels are configured to relay two or more of the remote device E2E bearers; transmitting the second BSR when the one or more D2N logical channels are not configured to relay the one or more remote device E2E bearers, the second BSR including no information for identifying the one or more remote devices or the one or more remote device E2E bearers; and transmitting the first BSR or the second BSR when the one or more remote device E2E bearers correspond to a same remote device.

A fifth aspect of the disclosure, alone or in combination of any of the twelfth to fourteenth aspects, wherein the transmitting the first BSR includes: transmitting the first BSR in response to uplink data available on one or more device-to-network (D2N) logical channels established between the relay UE and the network entity, the uplink data corresponding to the one or more remote device E2E bearers.

A sixteenth aspect of the disclosure, alone or in combination of any of the twelfth to fifteenth aspects, wherein the first BSR includes at least one of: one or more device identifiers for identifying the one or more remote devices with uplink data available, a placement of the one or more device identifiers in the first BSR indicating a relative priority of the one or more remote devices on the one or more direct link connections; or one or more bearer identifiers for identifying the one or more remote device E2E bearers, a placement of the one or more bearer identifiers in the first BSR indicating a relative priority of the one or more remote device E2E bearers on the one or more direct link connections.

A seventeenth aspect of the disclosure, alone or in combination of any of the twelfth to sixteenth aspects, wherein the first BSR further includes: a logical channel group (LCG) field identifying a LCG including one or more device-to-network (D2N) logical channels for relaying the one or more remote device E2E bearers between the relay UE and the network entity; and a LCG buffer size field for indicating an amount of data available across the one or more D2N logical channels.

An eighteenth aspect of the disclosure, alone or in combination of any of the twelfth to seventeenth aspects, wherein the first BSR further includes: one or more remote buffer size fields, each remote buffer size field indicating an amount of data available for: one of the one or more device identifiers; or a combination of one of the one or more device identifiers and one of the one or more bearer identifiers.

A nineteenth aspect of the disclosure, alone or in combination of any of the twelfth to sixteenth aspects, wherein the first BSR includes: a plurality of logical channel group (LCG) fields, each LCG field configured to indicate a presence of a corresponding remote device identifier list in the first BSR, wherein the remote device identifier list includes the information for at least one of identifying the one or more remote devices or the one or more remote device E2E bearers.

A twentieth aspect of the disclosure, alone or in combination of the nineteenth aspect, wherein the remote device identifier list includes at least one of: one or more device identifiers for identifying the one or more remote devices with uplink data available, a placement of the one or more device identifiers in the remote device identifier list indicating a relative priority of the one or more remote devices on the one or more direct link connections; or one or more bearer identifiers for identifying the one or more remote device E2E bearers, a placement of the one or more bearer identifiers in the remote device identifier list indicating a relative priority of the one or more remote device E2E bearers on the one or more direct link connections.

A twenty-first aspect of the disclosure, alone or in combination of the twentieth aspect, wherein the remote device identifier list further includes: one or more remote buffer size fields, each remote buffer size field indicating an amount of data available for: one of the one or more device identifiers; or a combination of one of the one or more device identifiers and one of the one or more bearer identifiers.

A twenty-second aspect of the disclosure, alone or in combination of any of the nineteenth to twenty-first aspects, wherein each LCG field is further configured to indicate a presence of a corresponding LCG buffer size field in the first BSR, wherein the LCG buffer size field indicates an amount of data available across one or more device-to-network (D2N) logical channels included in a LCG.

A twenty-third aspect of the disclosure, alone or in combination of any of the twelfth to twenty-second aspects, wherein the one or more remote devices are out-of-coverage of the network entity.

A twenty-fourth aspect of the disclosure, alone or in combination of any of the twelfth to twenty-third aspects, further includes: receiving, from the network entity, resource allocation information including remote device information for at least one of identifying the one or more remote devices or the one or more remote device E2E bearers; and allocating communication resources to the one or more remote devices or the one or more remote device E2E bearers identified by the remote device information.

A twenty-fifth aspect of the disclosure, alone or in combination of the twenty-fourth aspect, further includes: allocating communication resources to the one or more remote device E2E bearers in consideration of a quality of service (QoS) requirement of the one or more remote device E2E bearers.

A twenty-sixth aspect of the disclosure provides a method of wireless communication at a network entity. The method includes: establishing one or more end-to-end (E2E) bearers between the network entity and one or more remote devices via a relay UE; receiving, from the relay UE, a buffer status report (BSR) for requesting communication resources, the BSR including information for at least one of identifying the one or more remote devices or the one or more E2E bearers; and determining a resources allocation for the one or more E2E bearers based on the BSR.

A twenty-seventh aspect of the disclosure, alone or in combination of the twenty-sixth aspect, wherein the BSR indicates uplink data available on one or more logical channels established between the relay UE and the network entity, the uplink data corresponding to the one or more E2E bearers.

A twenty-eighth aspect of the disclosure, alone or in combination of any of the twenty-sixth to twenty-seventh aspects, wherein the BSR includes at least one of: one or more device identifiers for identifying the one or more remote devices with uplink data available, a placement of the one or more device identifiers in the BSR indicating a relative priority of the one or more remote devices; or one or more bearer identifiers for identifying the one or more E2E bearers, a placement of the one or more bearer identifiers in the BSR indicating a relative priority of the one or more E2E bearers.

A twenty-ninth aspect of the disclosure, alone or in combination of any of the twenty-sixth to twenty-eighth aspects, wherein the BSR further includes: a logical channel group (LCG) field identifying a LCG including one or more logical channels for relaying the one or more E2E bearers between the relay UE and the network entity; and a LCG buffer size field for indicating an amount of data available across the one or more logical channels.

A thirtieth aspect of the disclosure, alone or in combination of any of the twenty-eight to twenty-ninth aspects, wherein the BSR further includes: one or more remote buffer size fields, each remote buffer size field indicating an amount of data available for: one of the one or more device identifiers; or a combination of one of the one or more device identifiers and one of the one or more bearer identifiers.

A thirty-first aspect of the disclosure, alone or in combination of any of the twenty-sixth to twenty-eighth aspects, wherein the BSR includes: a plurality of logical channel group (LCG) fields, each LCG field configured to indicate a presence of a corresponding remote device identifier list in the BSR, wherein the remote device identifier list includes the information for at least one of identifying the one or more remote devices or the one or more E2E bearers.

A thirty-second aspect of the disclosure, alone or in combination of the thirty-first aspect, wherein the remote device identifier list includes at least one of: one or more device identifiers for identifying the one or more remote devices with uplink data available, a placement of the one or more device identifiers in the remote device identifier list indicating a relative priority of the one or more remote devices; or one or more bearer identifiers for identifying the one or more E2E bearers, a placement of the one or more bearer identifiers in the remote device identifier list indicating a relative priority of the one or more E2E bearers.

A thirty-third aspect of the disclosure, alone or in combination of the thirty-second aspect, wherein the remote device identifier list further includes: one or more remote buffer size fields, each remote buffer size field indicating an amount of data available for: one of the one or more device identifiers; or a combination of one of the one or more device identifiers and one of the one or more bearer identifiers.

A thirty-fourth aspect of the disclosure, alone or in combination of any of the thirty-first to thirty-third aspects, wherein each LCG field is further configured to indicate a presence of a corresponding LCG buffer size field in the BSR, wherein the LCG buffer size field indicates an amount of data available across one or more logical channels included in a LCG.

A thirty-fifth aspect of the disclosure, alone or in combination of any of the twenty-sixth to thirty-fourth aspects, wherein the one or more remote devices are out-of-coverage of the network entity.

A thirty-sixth aspect of the disclosure, alone or in combination of any of the twenty-sixth to thirty-fifth aspects, wherein the determining the resources allocation includes: transmitting, to the relay UE, resource allocation information including remote device information for at least one of identifying the one or more remote devices or the one or more E2E bearers, wherein the resource allocation information allocates communication resources to the one or more remote devices or the one or more E2E bearers identified by the remote device information.

A thirty-seventh aspect of the disclosure, alone or in combination of the thirty-sixth aspect, wherein the transmitting the resource allocation information includes: transmitting resource allocation information in downlink control information (DCI) including at least one of: one or more device identifiers corresponding to the one or more remote devices; or one or more bearer identifiers corresponding to the one or more E2E bearers.

A thirty-eighth aspect of the disclosure, alone or in combination of any of the thirty-sixth to thirty-seventh aspects, wherein the resource allocation information allocates communication resources to the one or more remote devices or the one or more E2E bearers in consideration of an quality of service (QoS) requirement of the one or more E2E bearers.

A thirty-ninth aspect of the disclosure provides a user equipment (UE) for wireless communication, including: a transceiver configured for wireless communication; a memory; and a processor coupled with the transceiver and the memory, wherein the processor and the memory are configured to: establish direct link communication between the UE and one or more remote devices for relaying one or more remote device end-to-end (E2E) bearers between the one or more remote devices and a network entity; multiplex the one or more remote device E2E bearers to one or more device-to-network (D2N) logical channels between the UE and the network entity; receive resource allocation information from the network entity; and allocate, based on the resource allocation information, communication resources to the one or more remote devices E2E bearers in consideration of at least in part a quality of service (QoS) requirement of the one or more remote device E2E bearers. The UE can be configured to perform any of the methods of the first to eleventh aspects.

A fortieth aspect of the disclosure provides a relay user equipment (UE), including: a transceiver configured for wireless communication; a memory; and a processor coupled with the transceiver and the memory, wherein the processor and the memory are configured to: establish one or more direct link connections between the relay UE and one or more remote devices for relaying one or more remote device end-to-end (E2E) bearers between the one or more remote devices and a network entity; and transmit a first buffer status report (BSR) to the network entity for requesting communication resources from the network entity, the first BSR including information for at least one of identifying the one or more remote devices or the one or more remote device E2E bearers. The relay UE can be configured to perform any of the methods of the twelfth to twenty-fifth aspects.

A forty-first aspect of the disclosure provides a network entity for wireless communication, including: a transceiver configured for wireless communication; a memory; and a processor coupled with the transceiver and the memory, wherein the processor and the memory are configured to: establish one or more end-to-end (E2E) bearers between the network entity and one or more remote devices via a relay UE; receive, from the relay UE, a buffer status report (BSR) for requesting communication resources, the BSR including information for at least one of identifying the one or more remote devices or the one or more E2E bearers; and determine resource allocation information for the one or more E2E bearers based on the BSR. The network entity can be configured to perform any of the methods of the twenty-sixth to thirty-eighth aspects.

A forty-second aspect of the disclosure provides a user equipment (UE) for wireless communication, including: a transceiver configured for wireless communication; a memory; and a processor coupled to the transceiver and the memory, the processor and the memory are configured to: establish direct link communication between the UE and at least one remote device that relays at least one remote device end-to-end (E2E) bearer between the at least one remote device and a network entity; multiplex the at least one remote device E2E bearer onto at least one device-to-network (D2N) logical channel between the UE and the network entity; receive resource allocation information associated with the at least one D2N logical channel from the network entity; and allocate at least a portion of communication resources indicated by the resource allocation information to the at least one remote device E2E bearer according to at least in part a quality of service (QoS) requirement of the at least one remote device E2E bearer.

A forty-third aspect of the disclosure, alone or in combination with the forty-second aspect, wherein, for establishing the direct link communication, the processor and the memory are further configured to: establish, using a PC5 interface, a plurality of logical channels associated with the at least one remote device E2E bearer between the UE and the at least one remote device.

A forty-fourth aspect of the disclosure, alone or in combination with the forty-second aspect, wherein the processor and the memory are further configured to: multiplex the at least one remote device E2E bearer onto a single logical channel group (LCG) including the at least one D2N logical channel; or multiplex the at least one remote device E2E bearer onto a plurality of LCGs, each LCG including a subset of the at least one D2N logical channel.

A forty-fifth aspect of the disclosure, alone or in combination with the forty-second aspect, wherein the resource allocation information includes: a grant of the communication resources for a logical channel group including the at least one D2N logical channel multiplexed with the at least one remote device E2E bearer.

A forty-sixth aspect of the disclosure, alone or in combination with any of the forty-second to forty-fifth aspects, wherein the processor and the memory are further configured to: allocate the communication resources to the at least one remote device E2E bearer based on at least in part a priority order of the at least one remote device E2E bearer on the direct link communication.

A forty-seventh aspect of the disclosure, alone or in combination with the forty-sixth aspect, wherein the processor and the memory are further configured to: maintain a variable Bj for each of the at least one remote device E2E bearer; select one or more of the at least one remote device E2E bearer based on the variable Bj, wherein the variable Bj of each of the selected one or more remote device E2E bearers is greater than zero; allocate the communication resources to the selected one or more remote device E2E bearers in a decreasing priority order; and allocate remaining communication resources to unselected ones of the at least one remote device E2E bearer in a decreasing priority order without regard to the variable Bj, in a condition that the communication resources remain available after allocating the communication resources to the selected one or more remote device E2E bearers.

A forty-eighth aspect of the disclosure, alone or in combination with any of the forty-second to forty-fourth aspects, wherein the processor and the memory are further configured to: transmit a relay buffer status report (BSR) to the network entity to request the communication resources from the network entity, the relay BSR including information for at least one of identifying the at least one remote device or the at least one remote device E2E bearer.

A forty-ninth aspect of the disclosure, alone or in combination with the forty-eighth aspect, wherein the relay BSR includes at least one of: at least one device identifier for identifying the at least one remote device with uplink data available, a placement of the at least one device identifier in the relay BSR indicating a relative priority of the at least one remote device on the direct link communication; or at least one bearer identifier for identifying the at least one remote device E2E bearer, a placement of the at least one bearer identifier in the relay BSR indicating a relative priority of the at least one remote device E2E bearer on the direct link communication.

A fiftieth aspect of the disclosure provides a method of wireless communication at a user equipment (UE), including: establishing direct link communication between the UE and at least one remote device that relays at least one remote device end-to-end (E2E) bearer between the at least one remote device and a network entity; multiplexing the at least one remote device E2E bearer onto at least one device-to-network (D2N) logical channel between the UE and the network entity; receiving resource allocation information associated with the at least one D2N logical channel from the network entity; and allocating at least a portion of communication resources indicated by the resource allocation information to the at least one remote device E2E bearer according to at least in part a quality of service (QoS) requirement of the at least one remote device E2E bearer.

A fifty-first aspect of the disclosure, alone or in combination with the fiftieth aspect, wherein the multiplexing includes: multiplexing the at least one remote device E2E bearer onto a single logical channel group (LCG) including the at least one D2N logical channel; or multiplexing the at least one remote device E2E bearer onto a plurality of LCGs, each LCG including a subset of the at least one D2N logical channel.

A fifty-second aspect of the disclosure, alone or in combination with the fiftieth aspect, wherein the resource allocation information includes: a grant of the communication resources for a logical channel group including the at least one D2N logical channel multiplexed with the at least one remote device E2E bearer.

A fifty-third aspect of the disclosure, alone or in combination with any of the fiftieth to fifty-second aspects, wherein the allocating includes: allocating the communication resources to the at least one remote device E2E bearer based on at least in part a priority order of the at least one remote device E2E bearer on the direct link communication.

A fifty-fourth aspect of the disclosure, alone or in combination with the fifty-third aspect, wherein the allocating further includes: maintaining a variable Bj for each of the at least one remote device E2E bearer; selecting one or more of the at least one remote device E2E bearer based on the variable Bj, wherein the variable Bj of each of the selected one or more remote device E2E bearers is greater than zero; allocating the communication resources to the selected one or more remote device E2E bearers in a decreasing priority order; and allocating remaining communication resources to unselected ones of the at least one remote device E2E bearer in a decreasing priority order without regard to the variable Bj, in a condition that the communication resources remain available after allocating the communication resources to the selected one or more remote device E2E bearers.

A fifty-fifth aspect of the disclosure, alone or in combination with any of the fiftieth to fifty-second aspects, further including: transmitting a relay buffer status report (BSR) to the network entity to request the communication resources from the network entity, the relay BSR including information for at least one of identifying the at least one remote device or the at least one remote device E2E bearer.

A fifty-sixth aspect of the disclosure, alone or in combination with the fifty-fifth aspect, wherein the relay BSR includes at least one of: at least one device identifier for identifying the at least one remote device with uplink data available, a placement of the at least one device identifier in the relay BSR indicating a relative priority of the at least one remote device on the direct link communication; or at least one bearer identifier for identifying the at least one remote device E2E bearer, a placement of the at least one bearer identifier in the relay BSR indicating a relative priority of the at least one remote device E2E bearer on the direct link communication.

A fifty-seventh aspect of the disclosure provides a network entity for wireless communication, including: a transceiver configured for wireless communication; a memory; and a processor coupled to the transceiver and the memory, the processor and the memory are configured to: establish at least one end-to-end (E2E) bearer between the network entity and at least one remote device via a relay UE; receive, from the relay UE using the transceiver, a buffer status report (BSR) requesting communication resources, the BSR including information for at least one of identifying the at least one remote device or the at least one remote device E2E bearer; and transmit, to the relay UE using the transceiver, resource allocation information associated with the at least one E2E bearer based on the BSR.

A fifty-eighth aspect of the disclosure, alone or in combination with the fifty-seventh aspect, wherein the BSR includes at least one of: at least one device identifier identifying the at least one remote device with uplink data available, a placement of the at least one device identifier in the BSR indicating a relative priority of the at least one remote device; or at least one bearer identifier identifying the at least one E2E bearer, a placement of the at least one bearer identifier in the BSR indicating a relative priority of the at least one bearer.

A fifty-ninth aspect of the disclosure, alone or in combination with any of the fifty-seventh and fifty-eighth aspects, wherein the BSR further includes: a logical channel group (LCG) field identifying a LCG including one or more logical channels for relaying the at least one E2E bearer between the relay UE and the network entity; and a LCG buffer size field indicating an amount of data available across the one or more logical channels.

A sixtieth aspect of the disclosure, alone or in combination with the fifty-eighth aspect, wherein the BSR further includes: one or more remote buffer size fields, each remote buffer size field indicating an amount of data available for: one of the at least one device identifier; or a combination of one of the at least one device identifier and one of the at least one bearer identifier.

A sixty-first aspect of the disclosure, alone or in combination with the fifty-seventh aspect, wherein the BSR includes: a plurality of logical channel group (LCG) fields, each LCG field configured to indicate a presence of a corresponding remote device identifier list in the BSR, wherein the remote device identifier list includes the information for at least one of identifying the at least one remote device or the at least one E2E bearer.

A sixty-second aspect of the disclosure, alone or in combination with the sixty-first aspect, wherein each LCG field is further configured to indicate a presence of a corresponding LCG buffer size field in the BSR, wherein the LCG buffer size field indicates an amount of data available across one or more logical channels included in a LCG.

A sixty-third aspect of the disclosure, alone or in combination with any of the fifty-seventh, fifty-eighth, sixty-first, and sixty-second aspects, wherein the processor and the memory are further configured to: transmit, to the relay UE, the resource allocation information including remote device information for at least one of identifying the at least one remote device or the at least one E2E bearer, wherein the resource allocation information allocates communication resources to the at least one remote device or the at least one E2E bearer identified by the remote device information.

A sixty-fourth aspect of the disclosure, alone or in combination with the sixty-third aspect, wherein the resource allocation information allocates communication resources to the at least one remote device or the at least one E2E bearer according to a quality of service (QoS) requirement of the at least one E2E bearer.

A sixty-fifth aspect of the disclosure provides a method of wireless communication at a network entity, including: establishing at least one end-to-end (E2E) bearer between the network entity and at least one remote device via a relay UE; receiving, from the relay UE, a buffer status report (BSR) requesting communication resources, the BSR including information for at least one of identifying the at least one remote device or the at least one E2E bearer; and

US 12,604,333 B2

45                                                                                          46 transmit, to the relay UE, resource allocation information associated with the at least one E2E bearer based on the BSR.

A sixty-sixth aspect of the disclosure, alone or in combination with the sixty-fifth aspect, wherein the BSR includes at least one of: at least one device identifier identifying the at least one remote device with uplink data available, a placement of the at least one device identifier in the BSR indicating a relative priority of the at least one remote device; or at least one bearer identifier identifying the at least one E2E bearer, a placement of the at least one bearer identifier in the BSR indicating a relative priority of the at least one E2E bearer.

A sixty-seventh aspect of the disclosure, alone or in combination with the sixty-sixth aspect, wherein the BSR further includes: a logical channel group (LCG) field identifying a LCG including one or more logical channels for relaying the at least one E2E bearer between the relay UE and the network entity; a LCG buffer size field indicating an amount of data available across the one or more logical channels; and one or more remote buffer size fields, each remote buffer size field indicating an amount of data available for: one of the at least one device identifier; or a combination of one of the at least one device identifier and one of the at least one bearer identifier.

A sixty-eighth aspect of the disclosure, alone or in combination with the sixty-fifth aspect, wherein the BSR includes: a plurality of logical channel group (LCG) fields, each LCG field configured to indicate a presence of a corresponding remote device identifier list in the BSR, wherein the remote device identifier list includes the information for at least one of identifying the at least one remote device or the at least one E2E bearer.

A sixty-ninth aspect of the disclosure, alone or in combination with the sixty-eighth aspect, wherein each LCG field is further configured to indicate a presence of a corresponding LCG buffer size field in the BSR, wherein the LCG buffer size field indicates an amount of data available across one or more logical channels included in a LCG.

A seventieth aspect of the disclosure, alone or in combination with any of the sixty-fifth to sixth-ninth aspects, further including: transmitting, to the relay UE, the resource allocation information including remote device information for at least one of identifying the at least one remote device or the at least one E2E bearer, wherein the resource allocation information allocates communication resources to the at least one remote device or the at least one E2E bearer identified by the remote device information.

A seventy-first aspect of the disclosure, alone or in combination with the seventieth aspect, wherein the resource allocation information allocates communication resources to the at least one remote device or the at least one E2E bearer according to a quality of service (QoS) requirement of the at least one E2E bearer.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-20 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-20 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment (UE) for wireless communication, comprising:
a transceiver configured for wireless communication;
a memory; and
a processor coupled to the transceiver and the memory, the processor and the memory are configured to:
establish direct link communication between the UE and at least one remote device that relays at least one remote device end-to-end (E2E) bearer between the at least one remote device and a network entity;
multiplex the at least one remote device E2E bearer onto at least one device-to-network (D2N) logical channel between the UE and the network entity;
receive resource allocation information associated with the at least one D2N logical channel from the network entity; and
allocate at least a portion of communication resources indicated by the resource allocation information to the at least one remote device E2E bearer according to at least in part a quality of service (QoS) requirement of the at least one remote device E2E bearer.

2. The UE of claim 1, wherein, for establishing the direct link communication, the processor and the memory are further configured to:
establish, using a PC5 interface, a plurality of logical channels associated with the at least one remote device E2E bearer between the UE and the at least one remote device.

3. The UE of claim 1, wherein the processor and the memory are further configured to:
multiplex the at least one remote device E2E bearer onto a single logical channel group (LCG) comprising the at least one D2N logical channel; or
multiplex the at least one remote device E2E bearer onto a plurality of LCGs, each LCG comprising a subset of the at least one D2N logical channel.

4. The UE of claim 1, wherein the resource allocation information comprises:
a grant of the communication resources for a logical channel group comprising the at least one D2N logical channel multiplexed with the at least one remote device E2E bearer.

5. The UE of claim 4, wherein the processor and the memory are further configured to:
allocate the communication resources to the at least one remote device E2E bearer based on at least in part a priority order of the at least one remote device E2E bearer on the direct link communication.

6. The UE of claim 5, wherein the processor and the memory are further configured to:
maintain a variable Bj for each of the at least one remote device E2E bearer;
select one or more of the at least one remote device E2E bearer based on the variable Bj, wherein the variable Bj of each of the selected one or more remote device E2E bearers is greater than zero;

allocate the communication resources to the selected one or more remote device E2E bearers in a decreasing priority order; and
allocate remaining communication resources to unselected ones of the at least one remote device E2E bearer in a decreasing priority order without regard to the variable Bj, in a condition that the communication resources remain available after allocating the communication resources to the selected one or more remote device E2E bearers.

7. The UE of claim 1, wherein the processor and the memory are further configured to:
transmit a relay buffer status report (BSR) to the network entity to request the communication resources from the network entity, the relay BSR comprising information for at least one of identifying the at least one remote device or the at least one remote device E2E bearer.

8. The UE of claim 7, wherein the relay BSR comprises at least one of:
at least one device identifier for identifying the at least one remote device with uplink data available, a placement of the at least one device identifier in the relay BSR indicating a relative priority of the at least one remote device on the direct link communication; or
at least one bearer identifier for identifying the at least one remote device E2E bearer, a placement of the at least one bearer identifier in the relay BSR indicating a relative priority of the at least one remote device E2E bearer on the direct link communication.

9. A method of wireless communication at a user equipment (UE), comprising:
establishing direct link communication between the UE and at least one remote device that relays at least one remote device end-to-end (E2E) bearer between the at least one remote device and a network entity;
multiplexing the at least one remote device E2E bearer onto at least one device-to-network (D2N) logical channel between the UE and the network entity;
receiving resource allocation information associated with the at least one D2N logical channel from the network entity; and
allocating at least a portion of communication resources indicated by the resource allocation information to the at least one remote device E2E bearer according to at least in part a quality of service (QoS) requirement of the at least one remote device E2E bearer.

10. The method of claim 9, wherein the multiplexing comprises:
multiplexing the at least one remote device E2E bearer onto a single logical channel group (LCG) comprising the at least one D2N logical channel; or
multiplexing the at least one remote device E2E bearer onto a plurality of LCGs, each LCG comprising a subset of the at least one D2N logical channel.

11. The method of claim 9, wherein the resource allocation information comprises:
a grant of the communication resources for a logical channel group comprising the at least one D2N logical channel multiplexed with the at least one remote device E2E bearer.

12. The method of claim 11, wherein the allocating comprises:
allocating the communication resources to the at least one remote device E2E bearer based on at least in part a priority order of the at least one remote device E2E bearer on the direct link communication.

13. The method of claim 12, wherein the allocating further comprises:

maintaining a variable Bj for each of the at least one remote device E2E bearer;

selecting one or more of the at least one remote device E2E bearer based on the variable Bj, wherein the variable Bj of each of the selected one or more remote device E2E bearers is greater than zero;

allocating the communication resources to the selected one or more remote device E2E bearers in a decreasing priority order; and allocating remaining communication resources to unselected ones of the at least one remote device E2E bearer in a decreasing priority order without regard to the variable Bj, in a condition that the communication resources remain available after allocating the communication resources to the selected one or more remote device E2E bearers.

14. The method of claim 9, further comprising:

transmitting a relay buffer status report (BSR) to the network entity to request the communication resources from the network entity, the relay BSR comprising information for at least one of identifying the at least one remote device or the at least one remote device E2E bearer.

15. The method of claim 14, wherein the relay BSR comprises at least one of:

at least one device identifier for identifying the at least one remote device with uplink data available, a placement of the at least one device identifier in the relay BSR indicating a relative priority of the at least one remote device on the direct link communication; or at least one bearer identifier for identifying the at least one remote device E2E bearer, a placement of the at least one bearer identifier in the relay BSR indicating a relative priority of the at least one remote device E2E bearer on the direct link communication.

16. A network entity for wireless communication, comprising:

a transceiver configured for wireless communication;

a memory; and a processor coupled to the transceiver and the memory, the processor and the memory are configured to:

establish at least one end-to-end (E2E) bearer between the network entity and at least one remote device via a relay UE;

receive, from the relay UE using the transceiver, a buffer status report (BSR) requesting communication resources, the BSR comprising information for at least one of identifying the at least one remote device or the at least one E2E bearer; and transmit, to the relay UE using the transceiver, resource allocation information associated with the at least one E2E bearer based on the BSR.

17. The network entity of claim 16, wherein the BSR comprises at least one of:

at least one device identifier identifying the at least one remote device with uplink data available, a placement of the at least one device identifier in the BSR indicating a relative priority of the at least one remote device; or at least one bearer identifier identifying the at least one E2E bearer, a placement of the at least one bearer identifier in the BSR indicating a relative priority of the at least one E2E bearer.

18. The network entity of claim 17, wherein the BSR further comprises:

a logical channel group (LCG) field identifying a LCG comprising one or more logical channels for relaying the at least one E2E bearer between the relay UE and the network entity; and a LCG buffer size field indicating an amount of data available across the one or more logical channels.

19. The network entity of claim 17, wherein the BSR further comprises:

one or more remote buffer size fields, each remote buffer size field indicating an amount of data available for:

one of the at least one device identifier; or a combination of one of the at least one device identifier and one of the at least one bearer identifier.

20. The network entity of claim 16, wherein the BSR comprises:

a plurality of logical channel group (LCG) fields, each LCG field configured to indicate a presence of a corresponding remote device identifier list in the BSR, wherein the remote device identifier list comprises the information for at least one of identifying the at least one remote device or the at least one E2E bearer.

21. The network entity of claim 20, wherein each LCG field is further configured to indicate a presence of a corresponding LCG buffer size field in the BSR, wherein the LCG buffer size field indicates an amount of data available across one or more logical channels included in a LCG.

22. The network entity of claim 16, wherein the processor and the memory are further configured to:

transmit, to the relay UE, the resource allocation information comprising remote device information for at least one of identifying the at least one remote device or the at least one E2E bearer, wherein the resource allocation information allocates communication resources to the at least one remote device or the at least one E2E bearer identified by the remote device information.

23. The network entity of claim 22, wherein the resource allocation information allocates communication resources to the at least one remote device or the at least one E2E bearer according to a quality of service (QoS) requirement of the at least one E2E bearer.

24. A method of wireless communication at a network entity, comprising:

establishing at least one end-to-end (E2E) bearer between the network entity and at least one remote device via a relay UE;

receiving, from the relay UE, a buffer status report (BSR) requesting communication resources, the BSR comprising information for at least one of identifying the at least one remote device or the at least one E2E bearer; and transmit, to the relay UE, resource allocation information associated with the at least one E2E bearer based on the BSR.

25. The method of claim 24, wherein the BSR comprises at least one of:

at least one device identifier identifying the at least one remote device with uplink data available, a placement of the at least one device identifier in the BSR indicating a relative priority of the at least one remote device; or at least one bearer identifier identifying the at least one E2E bearer, a placement of the at least one bearer identifier in the BSR indicating a relative priority of the at least one E2E bearer.

26. The method of claim 25, wherein the BSR further comprises:

a logical channel group (LCG) field identifying a LCG comprising one or more logical channels for relaying the at least one E2E bearer between the relay UE and the network entity;

a LCG buffer size field indicating an amount of data available across the one or more logical channels; and one or more remote buffer size fields, each remote buffer size field indicating an amount of data available for:

one of the at least one device identifier; or a combination of one of the at least one device identifier and one of the at least one bearer identifier.

27. The method of claim 24, wherein the BSR comprises:

a plurality of logical channel group (LCG) fields, each LCG field configured to indicate a presence of a corresponding remote device identifier list in the BSR, wherein the remote device identifier list comprises the information for at least one of identifying the at least one remote device or the at least one E2E bearer.

28. The method of claim 27, wherein each LCG field is further configured to indicate a presence of a corresponding LCG buffer size field in the BSR, wherein the LCG buffer size field indicates an amount of data available across one or more logical channels included in a LCG.

29. The method of claim 24, further comprising:

transmitting, to the relay UE, the resource allocation information comprising remote device information for at least one of identifying the at least one remote device or the at least one E2E bearer, wherein the resource allocation information allocates communication resources to the at least one remote device or the at least one E2E bearer identified by the remote device information.

30. The method of claim 29, wherein the resource allocation information allocates communication resources to the at least one remote device or the at least one E2E bearer according to a quality of service (QoS) requirement of the at least one E2E bearer.

* * * * *